US010283245B2

(12) United States Patent
Nagasaka

(10) Patent No.: US 10,283,245 B2
(45) Date of Patent: May 7, 2019

(54) ELECTROMAGNETIC ACTUATOR

(71) Applicant: DENSO CORPORATION, Kariya, Aichi-pref. (JP)

(72) Inventor: Shinsuke Nagasaka, Kariya (JP)

(73) Assignee: DENSO CORPORATION, Kariya (JP)

(*) Notice: Subject to any disclaimer, the term of this patent is extended or adjusted under 35 U.S.C. 154(b) by 4 days.

(21) Appl. No.: 15/526,452

(22) PCT Filed: Dec. 17, 2015

(86) PCT No.: PCT/JP2015/006301
§ 371 (c)(1),
(2) Date: May 12, 2017

(87) PCT Pub. No.: WO2016/103662
PCT Pub. Date: Jun. 30, 2016

(65) Prior Publication Data
US 2017/0345537 A1  Nov. 30, 2017

(30) Foreign Application Priority Data

Dec. 26, 2014 (JP) .................. 2014-263983
Oct. 28, 2015 (JP) .................. 2015-211824

(51) Int. Cl.
*F16K 31/06* (2006.01)
*H01F 7/121* (2006.01)
(Continued)

(52) U.S. Cl.
CPC ............. *H01F 7/121* (2013.01); *F16K 31/02* (2013.01); *F16K 31/0613* (2013.01);
(Continued)

(58) Field of Classification Search
CPC .... H01F 2007/086; H01F 7/126; H01F 7/127; H01F 7/16; H01F 7/1607; F16K 31/02;
(Continued)

(56) References Cited

U.S. PATENT DOCUMENTS 3,243,157 A * 3/1966 Beck ................ F16K 47/04
137/340
6,206,343 B1 * 3/2001 Kato .................. F16K 31/0613
251/129.15

(Continued)

FOREIGN PATENT DOCUMENTS

JP  2001-343077  12/2001
JP  2014-47650    3/2014

OTHER PUBLICATIONS

International Search Report for PCT/JP2015/006301, dated Mar. 1, 2016, 2 pages.

*Primary Examiner* — Ian G Paquette
(74) *Attorney, Agent, or Firm* — Nixon & Vanderhye P.C.

(57) ABSTRACT

An electromagnetic drive device includes a through-hole, through which a rod is received, and the rod includes an outer wall surface that is slidable relative to the through-hole. A clearance, which is measured from the outer wall surface of the rod placed in a maximum projected position to an inner wall surface of the through-hole, is smaller than a clearance, which is measured from the outer wall surface of the rod placed in a maximum retracted position to the inner wall surface. Therefore, a retracting-time clearance becomes relatively large, and thereby a frictional force between the rod and a support tubular portion can be reduced. Furthermore, a projecting-time clearance becomes relatively small, and thereby the amount of swing of a distal end of the rod in a radial direction can be reduced.

11 Claims, 22 Drawing Sheets

(51) Int. Cl.
*H01F 7/16* (2006.01)
*F16K 31/02* (2006.01)
*H01F 7/08* (2006.01)

(52) U.S. Cl.
CPC ........... *F16K 31/0675* (2013.01); *H01F 7/16* (2013.01); *H01F 7/1623* (2013.01); *H01F 2007/086* (2013.01)

(58) Field of Classification Search
CPC .. F16K 31/06; F16K 31/0603; F16K 31/0624; F16K 31/0644; F16K 31/0655
See application file for complete search history.

(56) References Cited

U.S. PATENT DOCUMENTS

| | | | |
|---|---|---|---|
| 6,409,055 B1 * | 6/2002 | Officier | B65B 39/004 222/559 |
| 6,443,707 B1 | 9/2002 | Kimura et al. | |
| 8,671,981 B2 * | 3/2014 | Lang | F16K 1/443 137/244 |
| 9,324,488 B2 * | 4/2016 | Dayton | H01F 7/081 |
| 9,334,946 B1 * | 5/2016 | Mason | F16H 57/0435 |
| 2014/0026836 A1 | 1/2014 | Matsumoto et al. | |

* cited by examiner

US 10,283,245 B2

ELECTROMAGNETIC ACTUATOR

CROSS REFERENCE TO RELATED APPLICATION

This application is the U.S. national phase of International Application No. PCT/JP2015/006301 filed Dec. 17, 2015, which designated the U.S. and claims priority to Japanese Patent Application No. 2014-263983 filed on Dec. 26, 2014 and Japanese Patent Application No. 2015-211824 filed on Oct. 28, 2015 the entire contents of each of which are hereby incorporated by reference.

TECHNICAL FIELD

The present disclosure relates to an electromagnetic actuator.

BACKGROUND ART

There is known an electromagnetic actuator that drives a plunger by a magnetic force generated through energization of a coil to operate an external device through a rod that is formed integrally with the plunger. For example, an electromagnetic actuator of the patent literature 1 is used to operate an oil pressure control valve of a valve timing adjuster device of an engine.

In the patent literature 1, the rod projects from the plunger in an axial direction. An outer peripheral surface of the rod is parallel with a central axis. A yoke forms a support portion that includes a through-hole, through which the rod is received.

When the rod is moved in the axial direction, the rod is slid along an inner wall surface of the through-hole of the support portion. At this time, when a friction force is large, wearing between the rod and the support portion may be increased, and there is a possibility of causing an immovable state of the rod, i.e., a possibility of occurrence of forced fitting of the rod against the inner wall surface of the through-hole. One countermeasure against this disadvantage may be increasing of a clearance between the rod and the inner wall surface of the through-hole.

When the amount of electric power supplied to the coil is increased, the magnetic force is increased. In response to the increase in the magnetic force, a projecting length of the rod, which projects from the support portion, is increased, and a force (side force), which is applied to the plunger in a radial direction, is increased. Therefore, the amount of swing of a distal end of the rod in the radial direction is disadvantageously increased when the projecting length of the rod, which projects from the support portion, is increased. One countermeasure against this disadvantage may be reducing of the clearance between the rod and the inner wall surface of the through-hole.

Therefore, it is obvious that the above two countermeasures are contradictory to each other. Specifically, when the size of the clearance is increased to reduce the frictional force between the rod and the support portion, the amount of swing of the distal end of the rod in the radial direction is disadvantageously increased. Furthermore, when the size of the clearance is reduced to reduce the amount of swing of the distal end of the rod in the radial direction, the frictional force between the rod and the support portion is disadvantageously increased.

CITATION LIST

Patent Literature

PATENT LITERATURE 1: JP2014-120714A (corresponding to US2014/0026836A1)

SUMMARY OF THE INVENTION

The present disclosure is made in view of the above points, and it is an objective of the present disclosure to provide an electromagnetic actuator that can achieve both of reducing a frictional force between a rod and a support portion and reducing the amount of swing of a distal end of the rod in a radial direction.

An electromagnetic actuator of the present disclosure includes a movable portion, an electromagnetic drive device and a rod. The movable portion is reciprocatable in a predetermined linear direction. An electromagnetic drive device includes a coil shaped into a ring form and is operable to generate a magnetic force, which drives the movable portion in the linear direction, when the coil is energized. The rod projects from the movable portion in the linear direction and is movable together with the movable portion from a maximum retracted position located on one side in the linear direction to a maximum projected position located on another side in the linear direction. The electromagnetic drive device includes a through-hole, through which the rod is received. The rod includes an outer wall surface that is slidable relative to the through-hole.

A clearance, which is measured from the outer wall surface of the rod placed in the maximum projected position to an inner wall surface of the through-hole, is smaller than a clearance, which is measured from the outer wall surface of the rod placed in the maximum retracted position to the inner wall surface.

With this construction, the clearance (retracting-time clearance), which is formed between the rod and the inner wall surface of the through-hole when the rod is placed at the retracted side, can be made relatively large. Also, the clearance (projecting-time clearance), which is formed between the rod and the inner wall surface of the through-hole when the rod is placed at the projected side, can be made relatively small. Thus, since the retracting-time clearance is relatively large, the frictional force between the rod and the support portion can be reduced. Furthermore, since the projecting-time clearance is relatively small, the amount of swing of the distal end of the rod in the radial direction can be reduced. That is, the reduction of the frictional force between the rod and the support portion and the reduction of the amount of swing of the distal end of the rod in the radial direction can be both achieved.

DESCRIPTION OF EMBODIMENTS

Hereinafter, various embodiments of the present disclosure will be described with reference to the drawings. Structures, which are substantially identical among the embodiments, are indicated by the same reference signs and will not be described redundantly for the sake of simplicity.

First Embodiment

Figure 1:
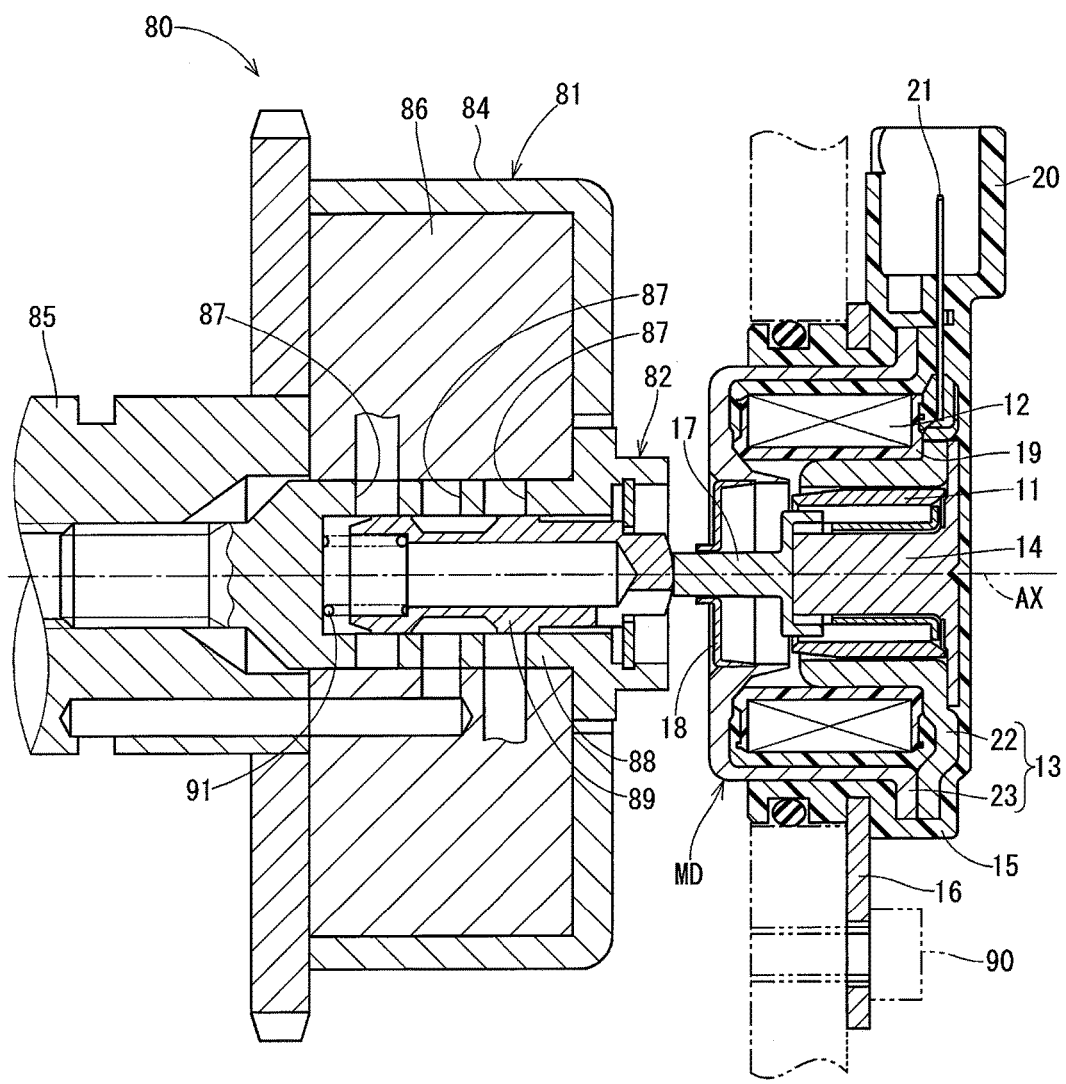
FIG. 1 is a cross sectional view for describing an electromagnetic actuator of a first embodiment of the present disclosure and a valve timing adjuster device and an oil pressure control valve of an engine.

An electromagnetic actuator according to a first embodiment of the present disclosure is applied to a valve timing adjuster system 80 of an engine shown in FIG. 1. The valve timing adjuster system 80 includes a valve timing adjuster device 81 and an oil pressure control valve 82.

The valve timing adjuster device 81 includes a housing 84, which is rotated synchronously with a crankshaft of the engine, and a vane rotor 86, which is rotated integrally with a camshaft 85 of the engine. Valve timing of intake valves or exhaust valves of the engine can be adjusted by changing a relative rotational phase between the housing 84 and the vane rotor 86. The vane rotor 86 is rotated relative to the housing 84 according to a degree of an oil pressure of oil pressure chambers (advancing chambers, retarding chambers) formed in an inside of the housing 84. The oil pressure of the oil pressure chambers is adjusted by an oil pressure control valve 82 that is placed at a center part of the vane rotor 86.

The oil pressure control valve 82 is a spool valve that includes a sleeve 88, which has a plurality of ports 87, and a spool 89, which is movable in an axial direction in an inside of the sleeve 88. Each port 87 is selectively opened or closed by changing an axial position of the spool 89, so that an oil passage, which supplies working oil to the corresponding oil pressure chambers in the housing 84, is changed. The electromagnetic actuator 10 is used to change the axial position of the spool 89 of the oil pressure control valve 82.

(Basic Structure)

First of all, a basic structure of the electromagnetic actuator 10 will be described with reference to FIGS. 1 to 3.

The electromagnetic actuator 10 includes an electromagnetic drive device MD, a housing 15, a bracket 16 and a rod (serving as an output shaft) 17. The electromagnetic drive device MD includes a plunger (serving as a movable portion) 11, a coil 12, a yoke 13, a core stator 14 and a cover 18. The electromagnetic actuator 10 changes an axial position of the spool 89 of the oil pressure control valve 82 by moving the rod 17 from a maximum retracted position, which is located at one side in the axial direction, to a maximum projected position, which is located at the other side in the axial direction.

Hereinafter, a direction, which is parallel to a central axis AX of the rod 17, will be referred to as an axial direction. The one side in the axial direction refers to an opposite side of the rod 17, which is opposite from the spool 89. The other side in the axial direction refers to a side of the rod 17 where the spool 89 is placed.

The plunger 11 is in a hollow tubular form and is made of a magnetic material. The plunger 11 is placed along the central axis AX and is reciprocatable in the axial direction. The axial direction corresponds to a linear direction of the present disclosure.

The coil 12 is formed with a winding that is wound around an outer side of a bobbin 19, which is made of resin and is shaped into a tubular form. The bobbin 19 is placed along the central axis AX and is located on the outer side of the plunger 11. When an electric power is supplied from an external electric power source to the coil 12 through terminals 21 of a connector 20 of the housing 15, the coil 12 generates a magnetic field.

In a cross section of the yoke 13 taken along the central axis AX, the yoke 13 surrounds the coil 12 and is made of a magnetic material. In the present embodiment, the yoke 13 includes a first yoke member 22 and a second yoke member 23. The first yoke member 22 includes a first inner tubular portion 24, which is placed on the inner side of the coil 12. The second yoke member 23 includes a second inner tubular portion 26, which is placed on the inner side of the coil 12 such that a magnetic gap 25 is interposed between the first inner tubular portion 24 and the second inner tubular portion 26. The first yoke member 22 and the second yoke member 23 are connected together on the outer side of the coil 12.

The core stator 14 includes a shaft portion 27 and a flange portion 28. The shaft portion 27 is placed on the inner side of the plunger 11. The flange portion 28 projects from an end part of the shaft portion 27, which is located on the one side in the axial direction, all the way to the first yoke member 22.

The housing 15 is made of resin and covers an outer side of a portion of the yoke 13.

The bracket 16 is formed to project from the housing 15 toward the outer side and includes installation holes 29, into which fixing members 90 can be respectively inserted.

The rod 17 projects from the plunger 11 toward the other side in the axial direction and can urge the spool 89 in the axial direction. The rod 17 is movable from a maximum retracted position, which is located at the one side in the axial direction as shown in FIGS. 1 and 2, to a maximum projected position, which is located at the other side in the axial direction as shown in FIG. 3. In the present embodiment, the maximum retracted position is a position, at which the rod 17 contacts the core stator 14. The maximum projected position is a position, at which the spool 89, which is urged by the rod 17, contacts an inner wall of the sleeve 88. In a state where the electromagnetic actuator 10 is uninstalled from the engine, the rod 17 can further move to the other side in the axial direction from the maximum projected position.

Figure 2:
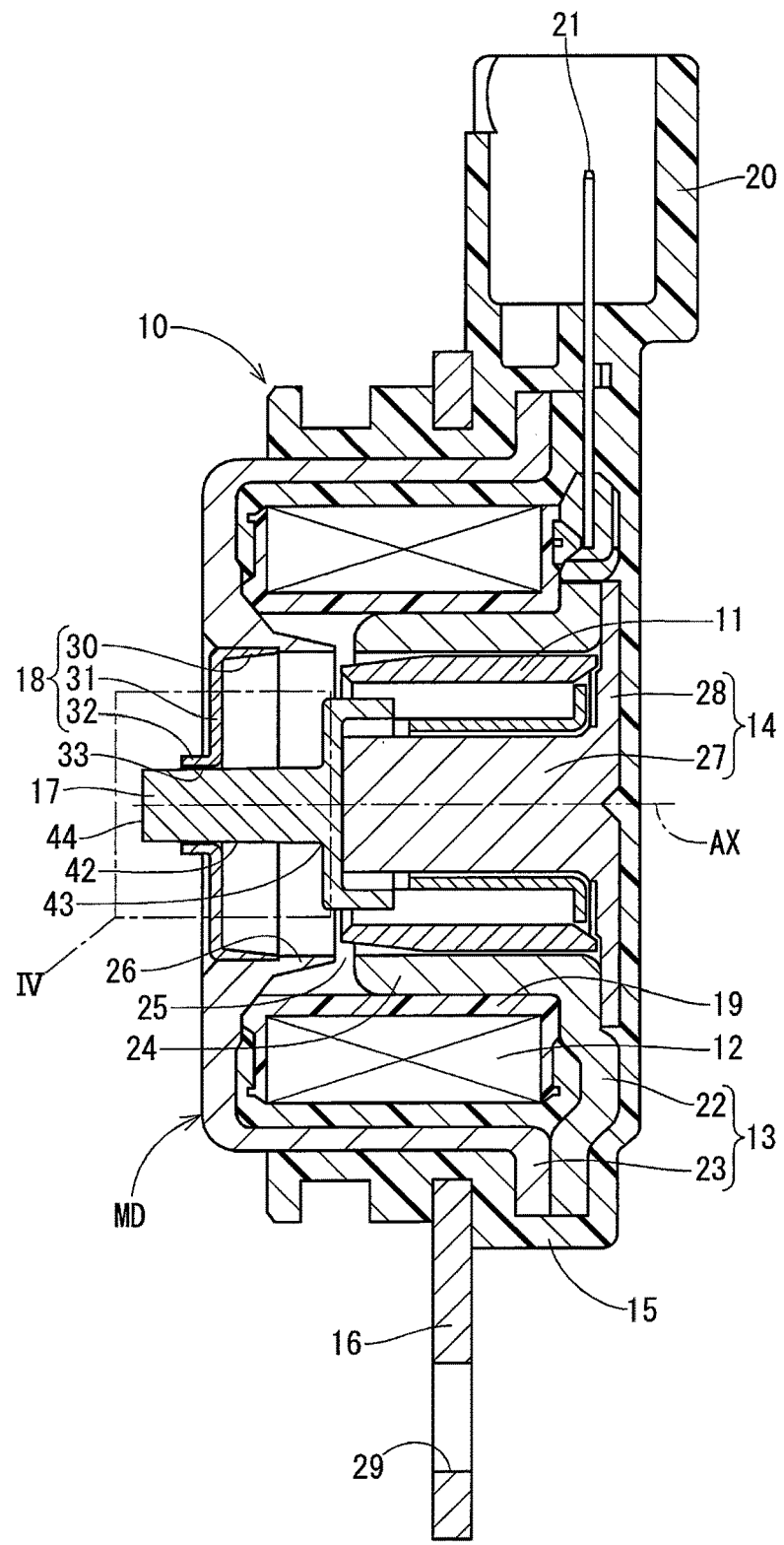
FIG. 2 is a cross sectional view of the electromagnetic actuator of FIG. 1, indicating a state where a rod is placed in a maximum retracted position.
Figure 3:
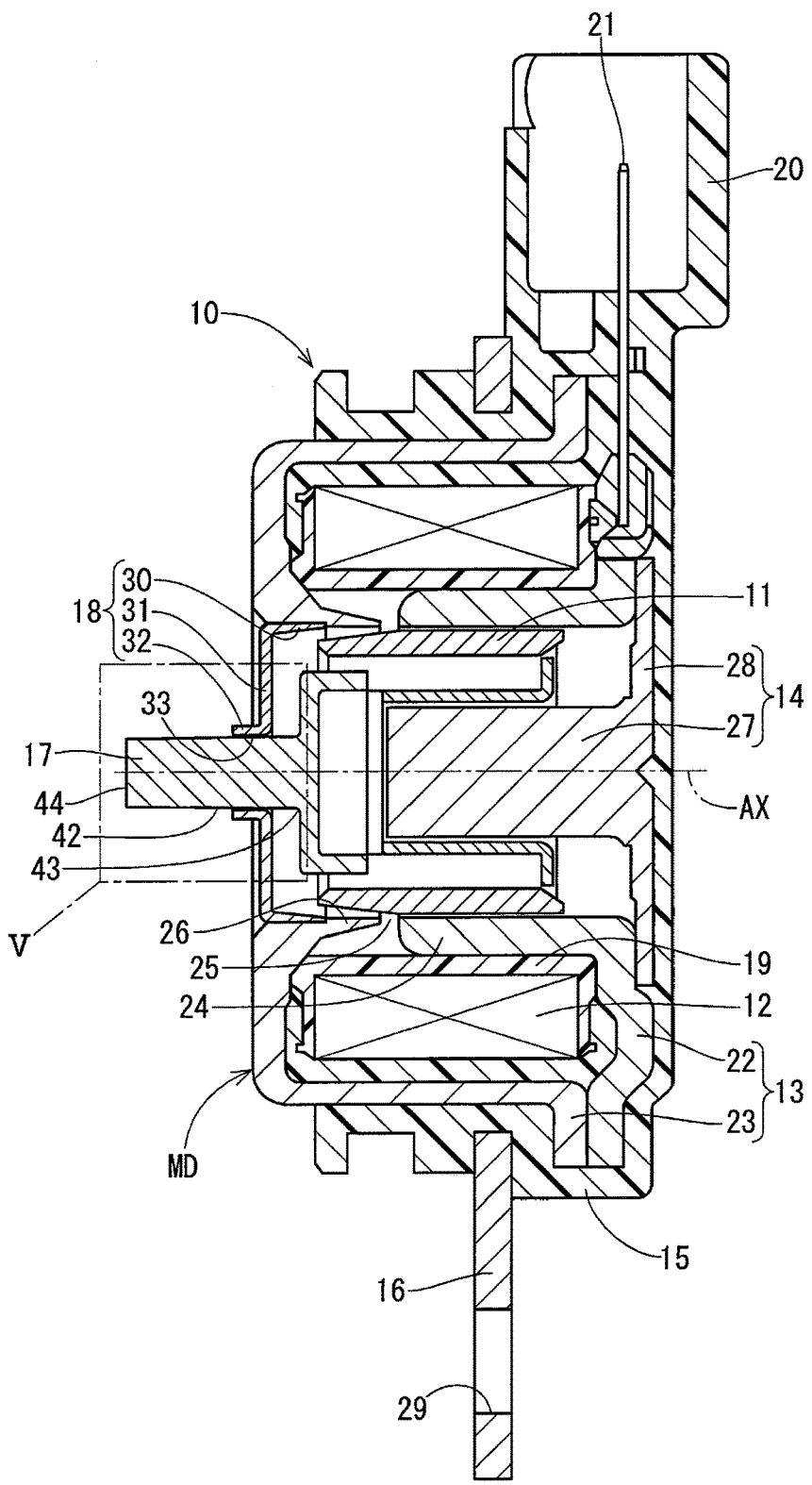
FIG. 3 is a cross sectional view of the electromagnetic actuator of FIG. 1, indicating a state where the rod is placed in a maximum projected position.

When the rod 17 is placed at the maximum retracted position, the plunger 11 is placed in an inside of the first inner tubular portion 24, as shown in FIG. 2. When the rod 17 is placed in the maximum projected position, the plunger 11 is placed to overlap with the first inner tubular portion 24 and the second inner tubular portion 26, as shown in FIG. 3.

The cover 18 includes a fitting tubular portion 30, an annular plate portion 31 and a support tubular portion 32. The fitting tubular portion 30 is securely fitted to an end part of the second inner tubular portion 26, which is located at the other side in the axial direction. The annular plate portion 31 projects from the fitting tubular portion 30 toward a radially inner side. The support tubular portion 32 projects from an inner peripheral part of the annular plate portion 31 toward the other side in the axial direction. The support tubular portion 32 includes a through-hole 33, through which the rod 17 is inserted. The support tubular portion 32 can support the rod 17, which is swung in the radial direction, at the time of, for example, applying a radial force to the plunger 11.

In the electromagnetic actuator 10, which is constructed in the above-described manner, in the state where the electric power is not supplied to the coil 12, the plunger 11 and the rod 17 are urged toward the one side in the axial direction by the spring 91 of the oil pressure control valve 82 through the spool 89 and is thereby placed in the maximum retracted position.

In contrast, when the electric power is supplied to the coil 12, a magnetic field is generated around the coil 12. Thereby, a magnetic circuit is formed by the yoke 13 and the plunger 11. At this time, a magnetic force, which is exerted toward the other side in the axial direction, is applied to the plunger 11 to move the plunger 11 such that the plunger 11 bypasses the magnetic gap 25, through which a magnetic flux is not easily conducted. When the amount of electric power supplied to the coil 12 is increased, i.e., when the amount of the magnetic flux, which flows through the magnetic circuit, is increased, the above-described magnetic force is increased. The axial positions of the plunger 11, the rod 17 and the spool 89 are determined by a balance between the above-described magnetic force and the urging force of the spring 91. When the electric power is supplied to the coil 12, the electromagnetic drive device MD can generate the magnetic force that drives the plunger 11 in the axial direction.

(Characteristic Structure)

Figure 4:
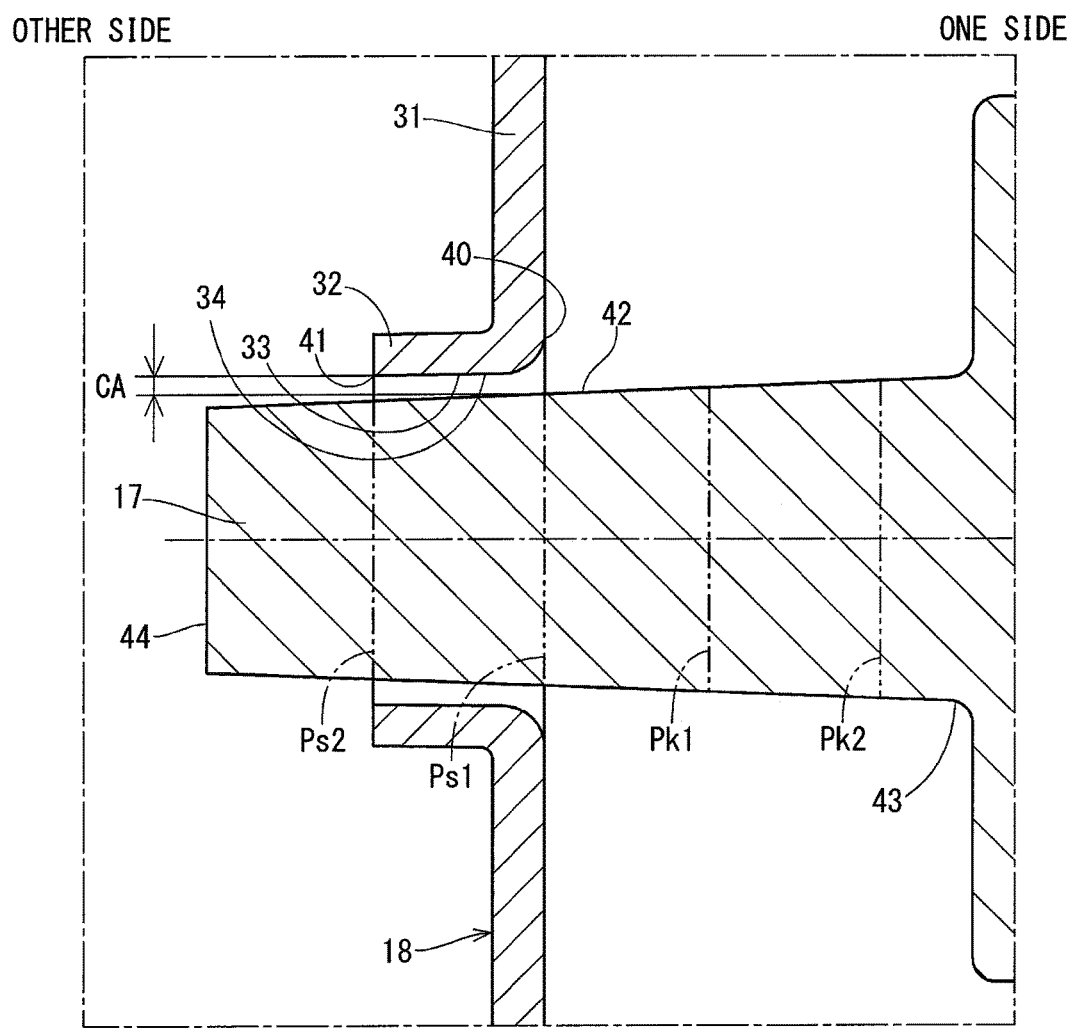
FIG. 4 is a diagram schematically showing a portion IV in FIG. 2 as an enlarged view.
Figure 5:
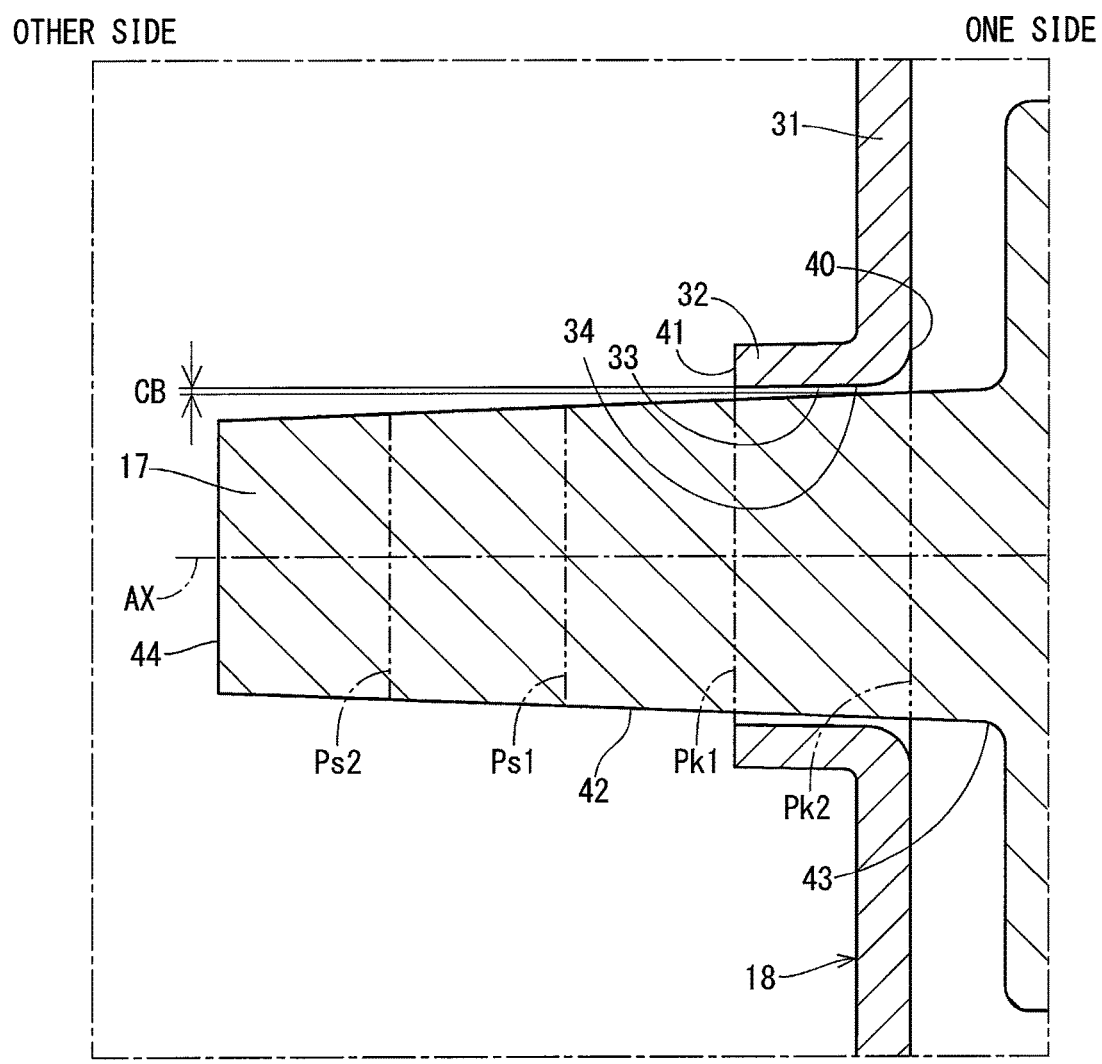
FIG. 5 is a diagram schematically showing a portion V in FIG. 3 as an enlarged view.

Next, the characteristic structure of the electromagnetic actuator 10 will be described with reference to FIGS. 4 and 5. In FIGS. 4 and 5, the respective portions are schematically depicted to ease the understanding of the characteristic structure, and the dimensions, the angles and dimensional ratios of the respective portions are not necessarily accurate.

In the following description, an edge of the through-hole 33, which is located at the one side in the axial direction, will be referred to as a first edge 40. Furthermore, an edge at another end of the through-hole 33, which is located at the other side in the axial direction, will be referred to as a second edge 41. The first edge 40 forms an opening end of the through-hole 33 at the one side in the axial direction and will be also referred to as a first opening end. The second edge 41 forms another opening end of the through-hole 33 at the other side in the axial direction and will be also referred to as a second opening end.

Furthermore, in the state where the rod 17 is placed in the maximum retracted position as shown in FIG. 4, a point of the rod 17, an axial position of which coincides with the first edge 40, will be referred to as a first distal end side specific point Ps1, and another point of the rod 17, an axial position of which coincides with the second edge 41, will be referred to as a second distal end side specific point Ps2. Each of the first distal end side specific point Ps1 and the second distal end side specific point Ps2 is virtually indicated by a corresponding dot-dot-dash line.

Furthermore, in the state where the rod 17 is placed in the maximum projected position as shown in FIG. 5, a point of the rod 17, an axial position of which coincides with the second edge 41, will be referred to as a first proximal end side specific point Pk1, and another point of the rod 17, an axial position of which coincides with the first edge 40, will be referred to as a second proximal end side specific point Pk2. Each of the first proximal end side specific point Pk1 and the second proximal end side specific point Pk2 is virtually indicated by a corresponding dot-dot-dash line.

The rod 17 has an outer wall surface 42 that is slidable along an inner wall surface 34 of the through-hole 33 when the rod 17 is moved in the axial direction. At least in an axial range of the outer wall surface 42, which is from the first proximal end side specific point Pk1 to the first distal end side specific point Ps1, the outer wall surface 42 is tapered such that a diameter of the outer wall surface 42 is progressively reduced from the proximal end 43 side of the rod 17 toward the distal end 44 side of the rod 17. In the present embodiment, the outer wall surface 42 is tapered throughout the entire range of the outer wall surface 42 that is from the proximal end 43 to the distal end 44.

"A clearance between the outer wall surface 42 of the rod 17 and the inner wall surface 34 of the through-hole 33" refers to a minimum distance between the outer wall surface 42 and the inner wall surface 34 when the rod 17 and the through-hole 33 are coaxial with each other. The clearance formed at the time of placing the rod 17 in the maximum retracted position will be denoted by CA. Furthermore, the clearance formed at the time of placing the rod 17 in the maximum projected position will be denoted by CB.

The cover 18 is formed with a plate material that is processed through a presswork process. The inner wall surface 34 of the through-hole 33 is tapered such that a diameter of the inner wall surface 34 is progressively reduced from the first edge 40 side to the second edge 41 side. A gradient of the outer wall surface 42 is larger than a gradient of the inner wall surface 34 of the through-hole 33. Thereby, the clearance, which is measured from the outer wall surface 42 of the rod 17 to the inner wall surface 34 of the through-hole 33, is set such that the clearance is progressively reduced toward the one side in the axial direction regardless of the axial position of the rod 17. The gradient of the outer wall surface 42 refers to an angle defined between the outer wall surface 42 and the central axis AX. The gradient of the inner wall surface 34 of the through-hole 33 refers to an angle defined between the inner wall surface 34 of the through-hole 33 and the central axis AX.

In FIGS. 4 and 5, each of the gradient of the outer wall surface 42 and the gradient of the inner wall surface 34 is increased from a real gradient thereof. Furthermore, the clearance is increased from a real clearance.

As discussed above, in the axial range between the first edge 40 and the second edge 41, the clearance CB, which is formed when the rod 17 is placed in the maximum projected position, is smaller than the clearance CA, which is formed when the rod 17 is placed in the maximum retracted position. That is, there exists a relationship of CA>CB.

Comparative Examples

Hereinafter, two comparative examples are described to clarify the advantages of the present embodiment.

Figure 19:
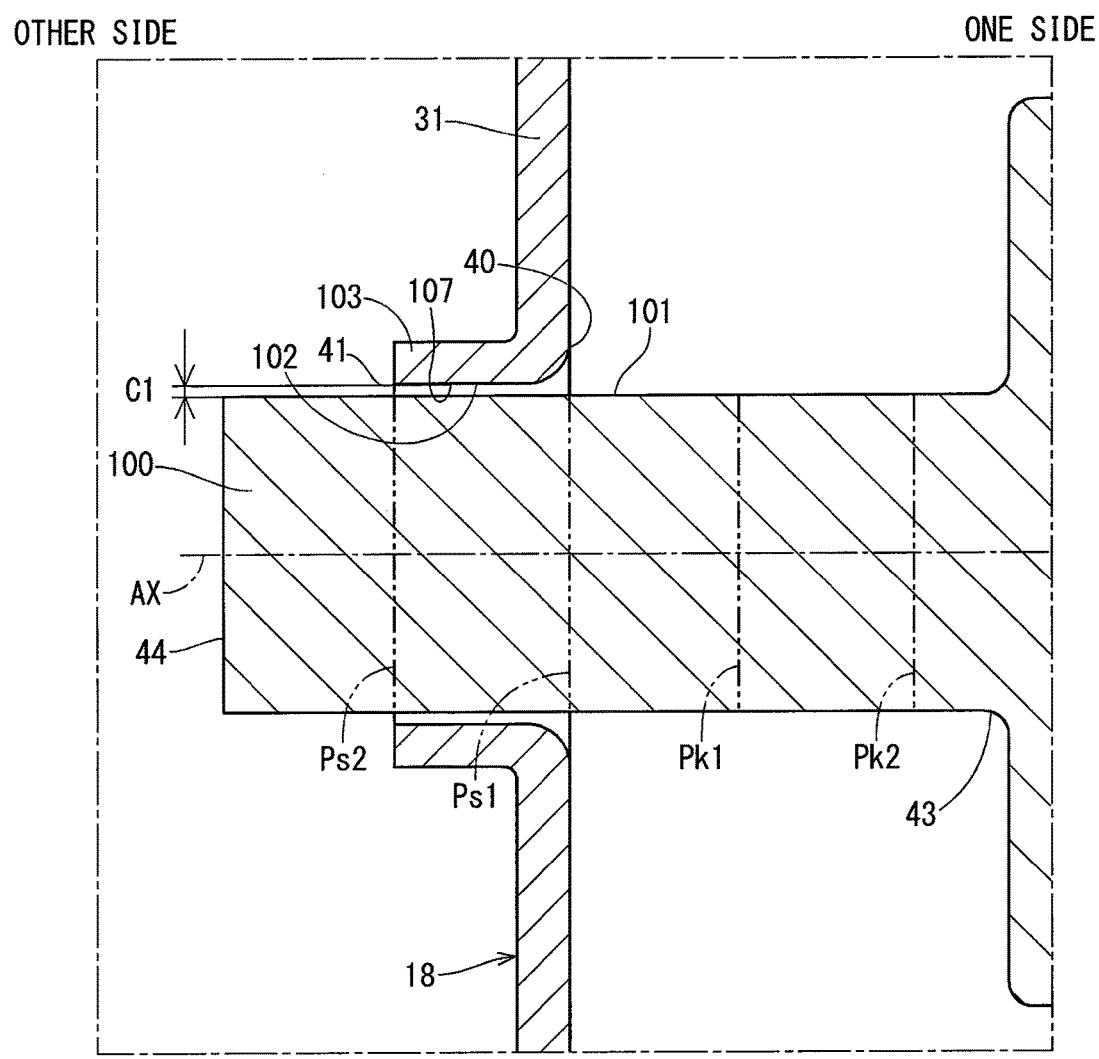
FIG. 19 is a schematic diagram showing a rod and a cover of an electromagnetic actuator in a first comparative example.

As schematically indicated in FIG. 19, in the first comparative example, an outer wall surface 101 of a rod 100 is a cylindrical surface that is parallel with the central axis AX, and an inner wall surface 107 of a through-hole 102 is a cylindrical surface that is parallel with the central axis AX. A clearance between the outer wall surface 101 of the rod 100 and the inner wall surface 107 of the through-hole 102 is denoted by C1. The clearance C1 is set to be relatively small such that the clearance C1 is substantially the same as the clearance CA, which is formed when the rod 17 is placed in the maximum projected position in the present embodiment.

Figure 20:
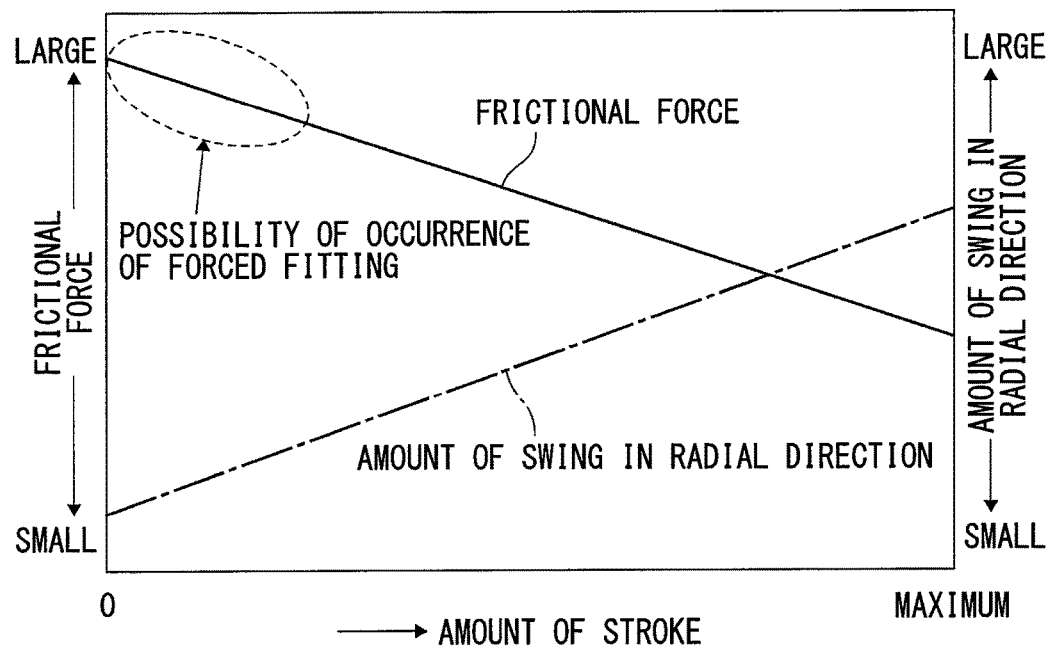
FIG. 20 is a diagram indicating a relationship between the amount of stroke of the rod and a frictional force applied to the rod in the electromagnetic actuator of FIG. 19 as well as a relationship between the amount of stroke of the rod and the amount of swing of a distal end of the rod in a radial direction of the rod in the electromagnetic actuator of FIG. 19.

According to the first comparative example discussed above, as shown in FIG. 20, the amount of swing of the rod 100 in the radial direction can be limited to the relatively small amount throughout the entire range of the amount of stroke of the rod 100. However, a frictional force between the outer wall surface 101 and the inner wall surface 107 of the through-hole 102 becomes relatively large. Thereby, wearing of the rod 100 and wearing of the support tubular portion 103 are increased, and there is a possibility of causing an immovable state of the rod 100, i.e., occurrence of forced fitting of the rod 100 against the inner wall surface 107.

Figure 21:
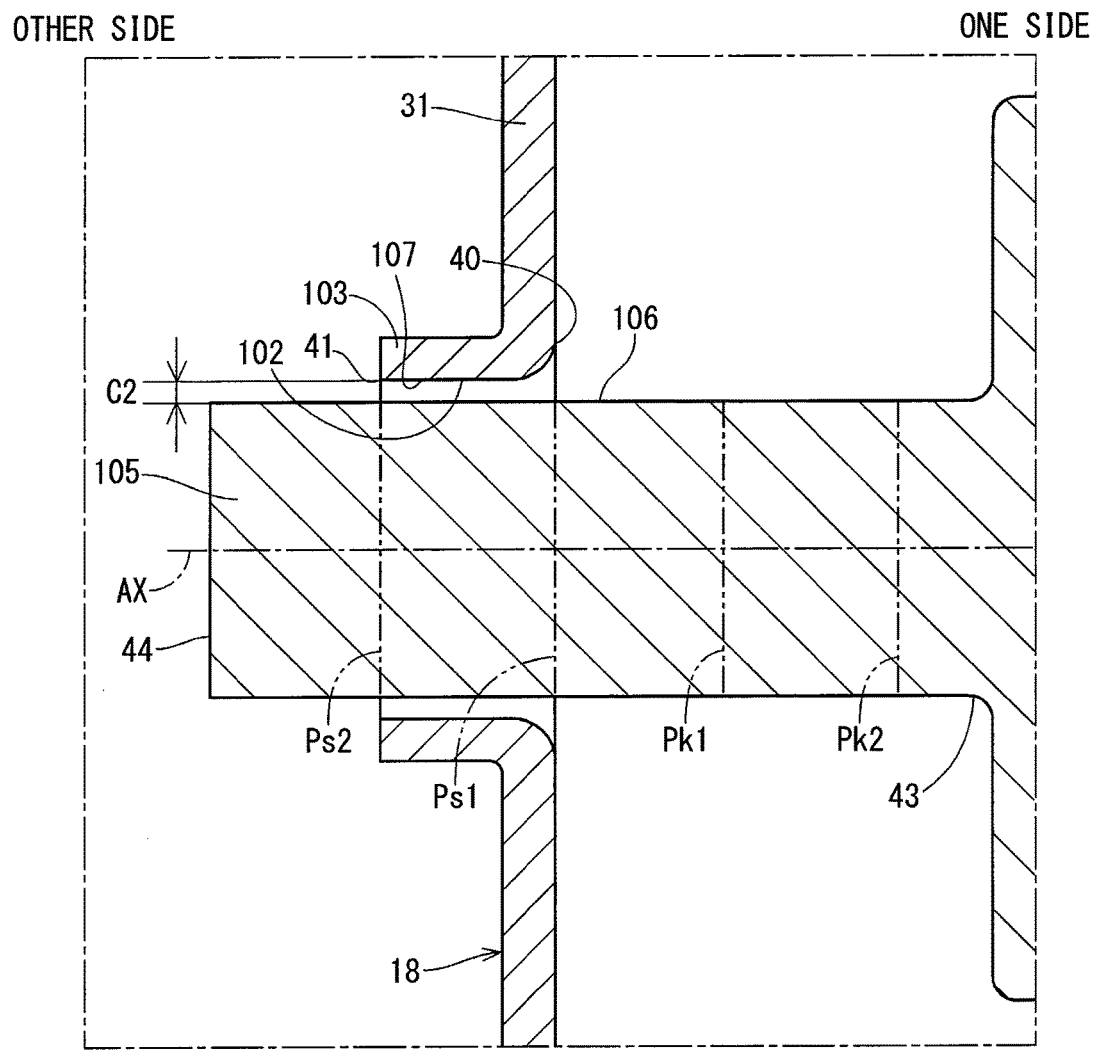
FIG. 21 is a schematic diagram showing a rod and a cover of an electromagnetic actuator in a second comparative example.

As schematically shown in FIG. 21, in the second comparative example, an outer wall surface 106 of a rod 105 is a cylindrical surface that is parallel with the central axis AX, and the inner wall surface 107 of the through-hole 102 is the cylindrical surface that is parallel with the central axis AX.

A clearance between the outer wall surface 106 of the rod 105 and the inner wall surface 107 of the through-hole 102 is denoted by C2. The clearance C2 is set to be relatively large such that the clearance C2 is substantially the same as the clearance CB, which is formed when the rod 17 is placed in the maximum retracted position in the present embodiment.

Figure 22:
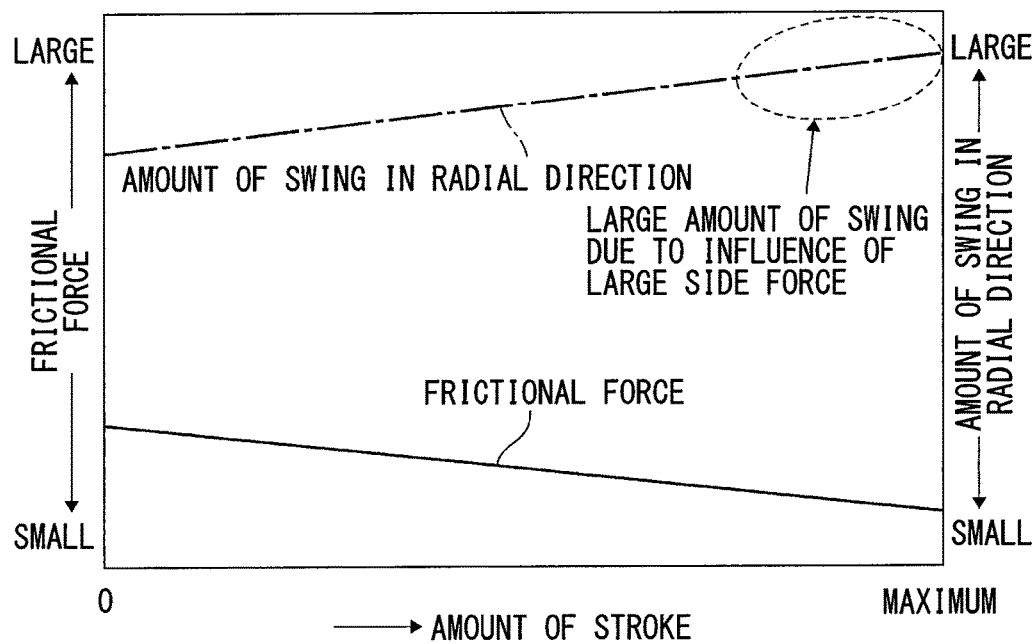
FIG. 22 is a diagram indicating a relationship between the amount of stroke of the rod and a frictional force applied to the rod in the electromagnetic actuator of FIG. 21 as well as a relationship between the amount of stroke of the rod and the amount of swing of a distal end of the rod in a radial direction of the rod in the electromagnetic actuator of FIG. 21.

According to the second comparative example, as shown in FIG. 22, the frictional force between the outer wall surface 106 and the inner wall surface 107 of the through-hole 102 can be limited to a relatively small frictional force throughout the entire range of the amount of stroke of the rod 105. However, the amount of swing of the rod 105 in the radial direction becomes relatively large. Particularly, when the amount of stroke of the rod 105 is large, a radial force (side force), which is applied to the plunger, is increased due to an influence of an increase in the magnetic force. Therefore, the rod 105 is largely swung in the radial direction.

Figure 6:
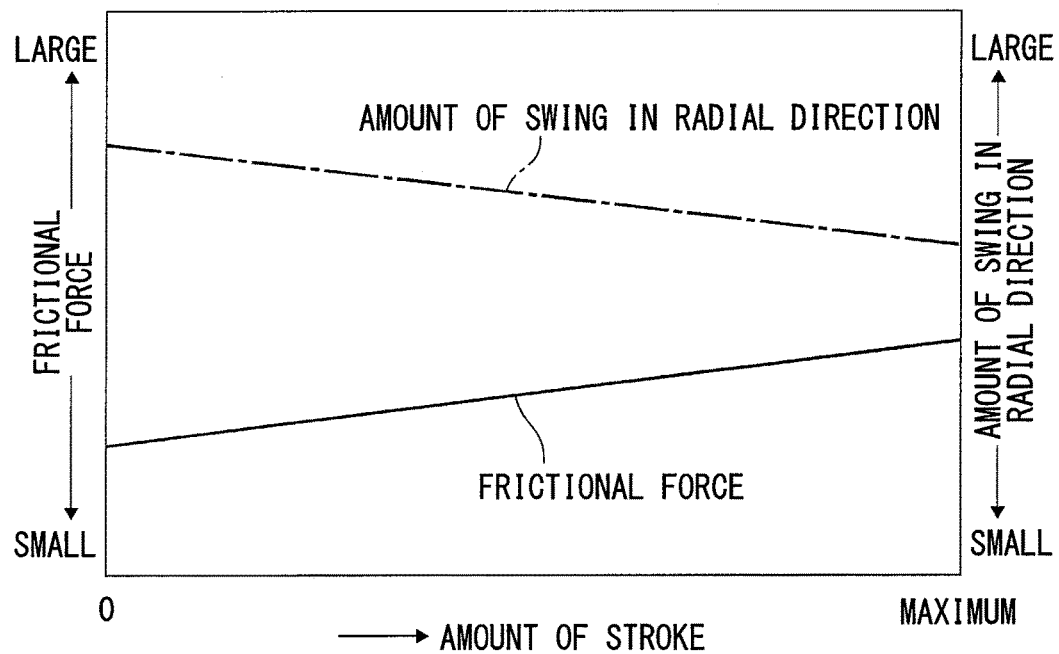
FIG. 6 is a diagram indicating a relationship between the amount of stroke of the rod and a frictional force applied to the rod in the electromagnetic actuator as well as a relationship between the amount of stroke of the rod and the amount of swing of a distal end of the rod in a radial direction of the rod.

In contrast, according to the first embodiment, the clearance CA, which is formed when the rod 17 is placed in the maximum projected position, is substantially the same as the clearance C1 of the first comparative example, and the clearance CB, which is formed when the rod 17 is placed in the maximum retracted position, is substantially the same as the clearance C2 of the second comparative example. Thus, as shown in FIG. 6, the amount of swing of the rod 17 in the radial direction can be limited to the relatively small amount to limit the frictional force between the outer wall surface 42 and the inner wall surface 34 of the through-hole 33 to the relatively small frictional force throughout the entire range of the amount of stroke of the rod 17.

Advantages

As discussed above, in the first embodiment, the rod 17 has the outer wall surface 42 that is tapered such that the diameter of the outer wall surface 42 is progressively reduced from the proximal end 43 side of the rod 17 toward the distal end 44 side of the rod 17 at least in the axial range of the outer wall surface 42, which is from the first proximal end side specific point Pk1 to the first distal end side specific point Ps1. Thereby, the clearance CB, which is formed when the rod 17 is placed in the maximum projected position, is smaller than the clearance CA, which is formed when the rod 17 is placed in the maximum retracted position.

With this construction, the clearance (retracting-time clearance), which is formed between the rod 17 and the inner wall surface 34 of the through-hole 33 when the rod 17 is placed at the retracted side, can be made relatively large. Also, the clearance (projecting-time clearance), which is formed between the rod 17 and the inner wall surface 34 of the through-hole 33 when the rod 17 is placed at the projected side, can be made relatively small. Thus, since the retracting-time clearance is relatively large, the frictional force between the rod 17 and the support tubular portion 32 can be reduced. Furthermore, since the projecting-time clearance is relatively small, the amount of swing of the distal end 44 of the rod 17 in the radial direction can be reduced. That is, the reduction of the frictional force between the rod 17 and the support tubular portion 32 and the reduction of the amount of swing of the distal end 44 of the rod 17 in the radial direction can be both achieved.

Furthermore, according to the first embodiment, the outer wall surface 42 is tapered at least in the axial range of the outer wall surface 42, which is from the first proximal end side specific point Pk1 to the first distal end side specific point Ps1.

With the above construction, the retracting-time clearance is increased in comparison to the case where the portion of the outer peripheral wall surface of the rod 17, which is located on the distal end 44 side of the first distal end side specific point Ps1, is parallel with the axial direction. Thus, the frictional force between the rod 17 and the support tubular portion 32 can be further reduced.

Furthermore, according to the first embodiment, the outer wall surface 42 is tapered at least in the axial range of the outer wall surface 42, which is from the first proximal end side specific point Pk1 to the first distal end side specific point Ps1.

With this construction, the projecting-time clearance is reduced in comparison to the case where the portion of the outer peripheral wall surface of the rod 17, which is located on the proximal end 43 side of the first proximal end side specific point Pk1, is parallel with the axial direction. Thus, the amount of swing of the distal end 44 of the rod 17 in the radial direction can be further reduced.

Furthermore, according to the first embodiment, the inner wall surface 34 of the through-hole 33 is tapered such that the diameter of the inner wall surface 34 is progressively reduced from the first edge 40 side toward the second edge 41 side. The gradient of the outer wall surface 42 is larger than the gradient of the inner wall surface 34 of the through-hole 33.

Figure 7:
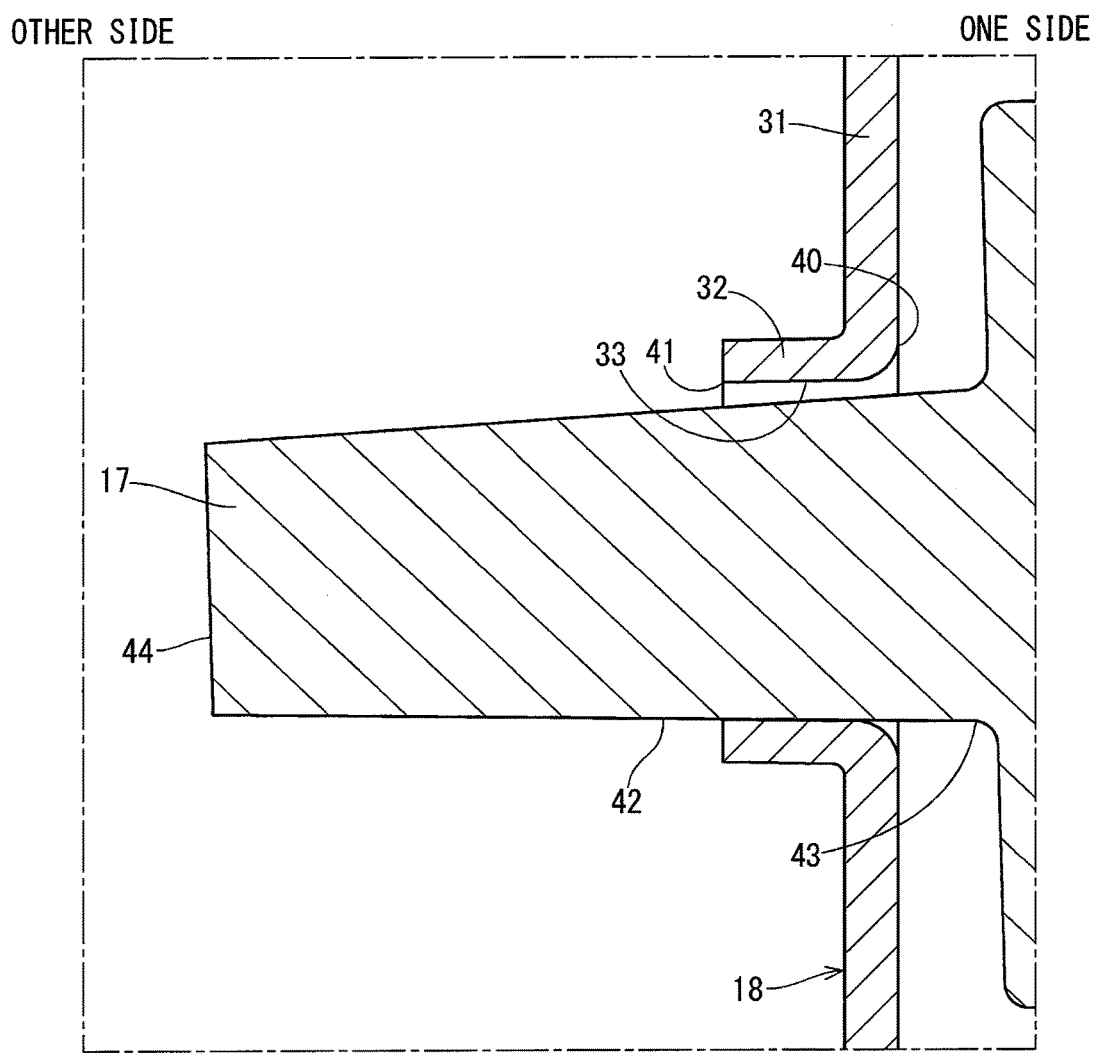
FIG. 7 is a diagram showing a state where the rod is swung in the radial direction from a state shown in FIG. 5.

With this construction, the clearance between the outer wall surface 42 and the inner wall surface 34 of the through-hole 33 is progressively reduced toward the one side in the axial direction regardless of the axial position of the rod 17. Thus, as shown in FIG. 7, it is possible to construct such that the outer wall surface 42 and the inner wall surface 34 of the through-hole 33 make surface-to-surface contact therebetween when the rod 17 is swung in the radial direction.

Second Embodiment

Figure 8:
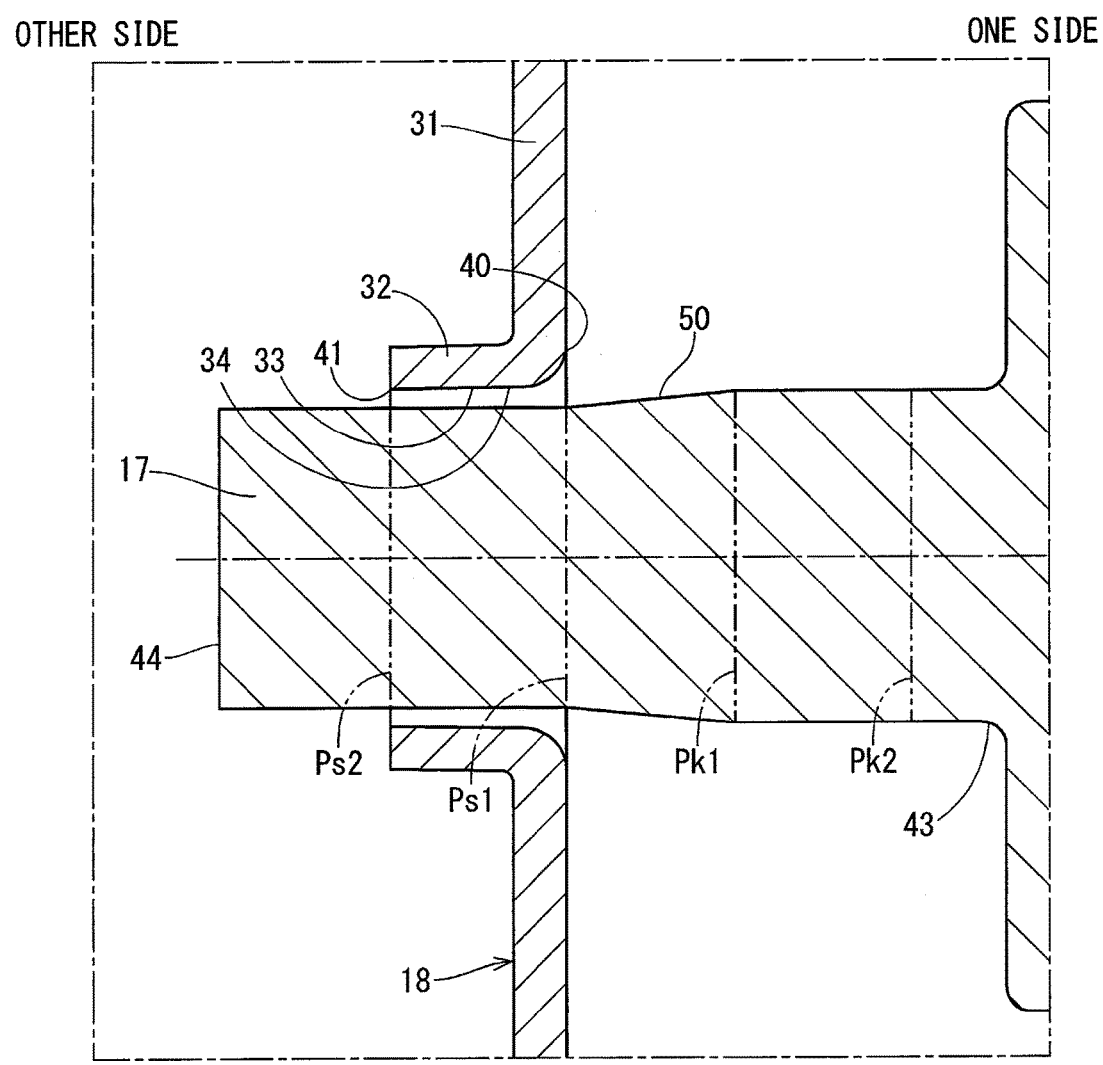
FIG. 8 is a schematic diagram showing a rod and a cover of an electromagnetic actuator according to a second embodiment of the present disclosure.

In a second embodiment of the present disclosure, as shown in FIG. 8, the outer wall surface 50 is tapered in an axial range, which is from the first proximal end side specific point Pk1 to the first distal end side specific point Ps1. A portion of the outer wall surface 50, which is located on the distal end 44 side of the first distal end side specific point Ps1, is parallel with the axial direction, and another portion of the outer wall surface 50, which is located on the proximal end 43 side of the first proximal end side specific point Pk1, is parallel with the axial direction. Even when the portion of the outer wall surface 50 is tapered, the reduction of the frictional force between the rod 17 and the support tubular portion 32 and the reduction of the amount of swing of the distal end 44 of the rod 17 in the radial direction can be both achieved in comparison to the first and second comparative examples.

Third Embodiment

Figure 9:
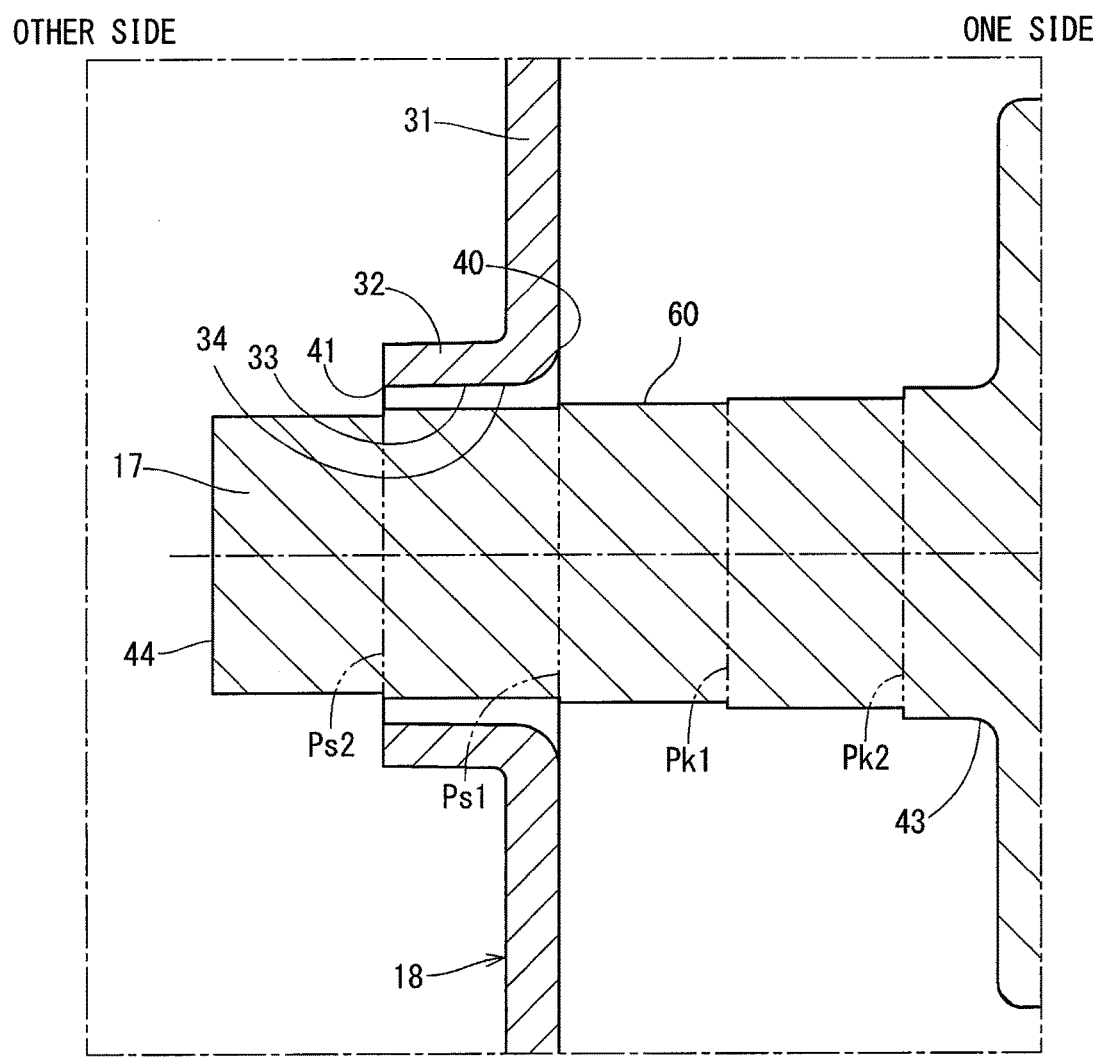
FIG. 9 is a schematic diagram showing a rod and a cover of an electromagnetic actuator according to a third embodiment of the present disclosure.

In a third embodiment of the present disclosure, as shown in FIG. 9, the outer wall surface 60 is shaped into a stepped form such that the diameter of the rod 17 is reduced in stepwise manner at predetermined intervals from the proximal end 43 side toward the distal end 44 side. The intervals, at each of which the diameter of the rod 17 is reduced, may be freely set. In the present embodiment, the outer wall surface 60 is sequentially stepped in a form of stairs throughout the entire range, which is from the proximal end 43 to the distal end 44. Even with this rod, which is shaped into the sequentially stepped form, the clearance CB, which is formed when the rod 17 is placed in the maximum projected position, is smaller than the clearance CA, which is formed when the rod 17 is placed in the maximum retracted position. Thus, advantages, which are similar to those of the first embodiment, can be achieved.

Fourth Embodiment

Figure 10:
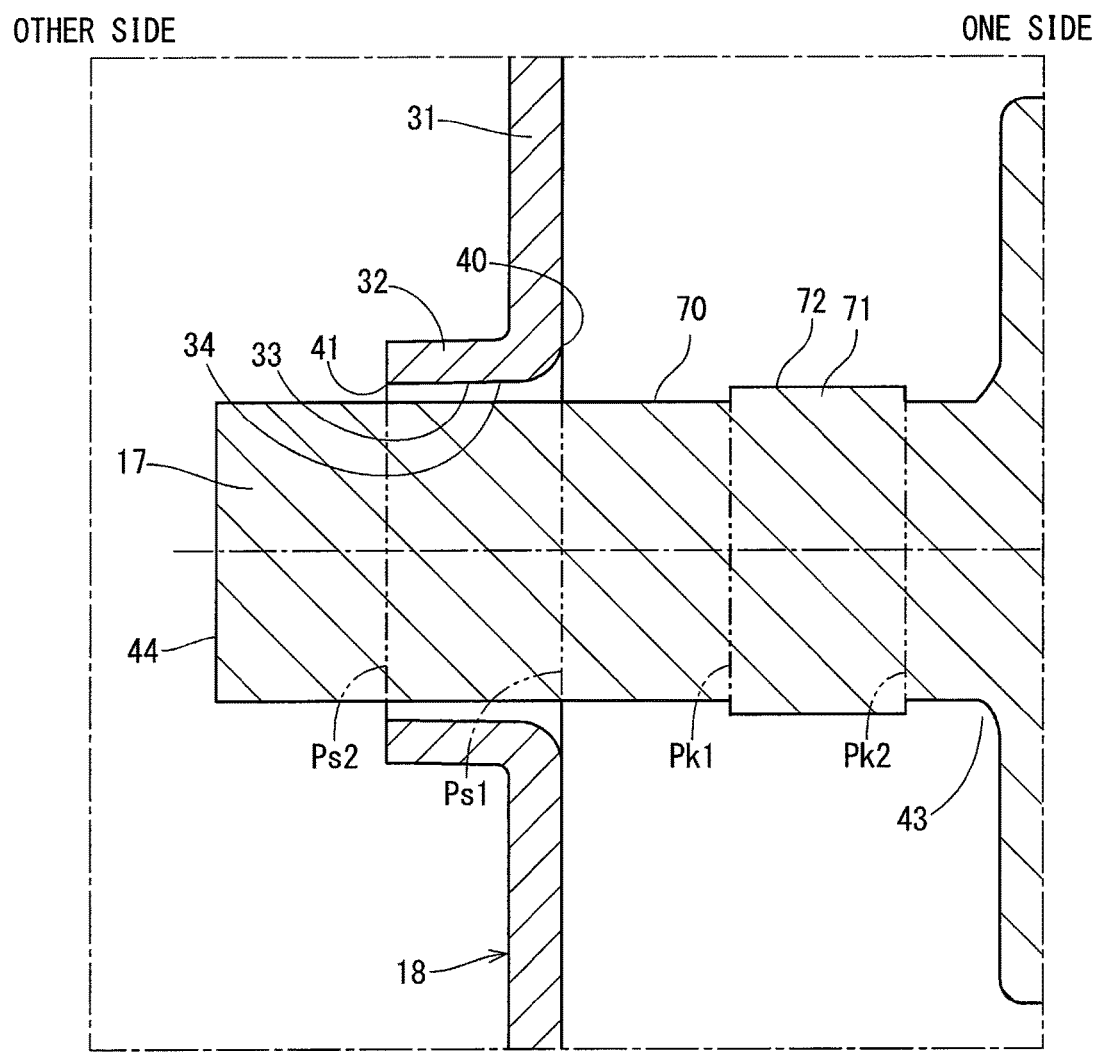
FIG. 10 is a schematic diagram showing a rod and a cover of an electromagnetic actuator according to a fourth embodiment of the present disclosure.

In a fourth embodiment of the present disclosure, as shown in FIG. 10, the rod 17 includes a projection 71, which outwardly projects in a radial direction of the rod 17 throughout an axial range that is form the first proximal end side specific point Pk1 to the second proximal end side specific point Pk2. Since the rod 17 includes the projection 71, the outer wall surface 70 includes a projecting surface 72, which outwardly projects in the radial direction. Since the outer wall surface 70 includes the projecting surface 72, the clearance CB, which is formed when the rod 17 is placed in the maximum projected position, is smaller than the clearance CA, which is formed when the rod 17 is placed in the maximum retracted position. Thus, even in the fourth embodiment, advantages, which are similar to those of the first embodiment, can be achieved.

Other Embodiments

Figure 11:
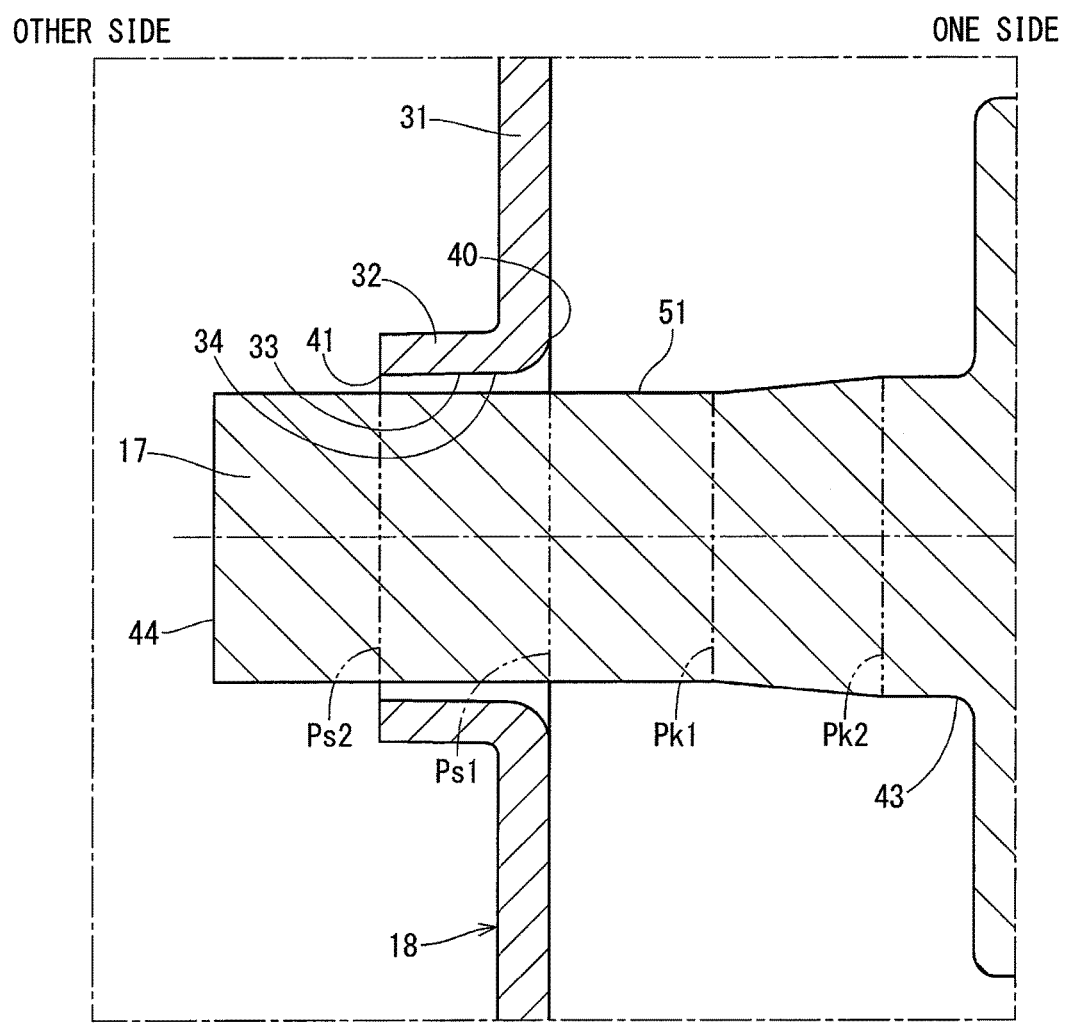
FIG. 11 is a schematic diagram showing a rod and a cover of an electromagnetic actuator of another embodiment of the present disclosure.

In another embodiment, which shares the idea of the second embodiment, as shown in FIG. 11, the outer wall surface 51 of the rod 17 may be tapered such that the diameter of the outer wall surface 51 is progressively reduced from the proximal end 43 side toward the distal end 44 side in an axial range that is from the second proximal end side specific point Pk2 to the first proximal end side specific point Pk1.

Figure 12:
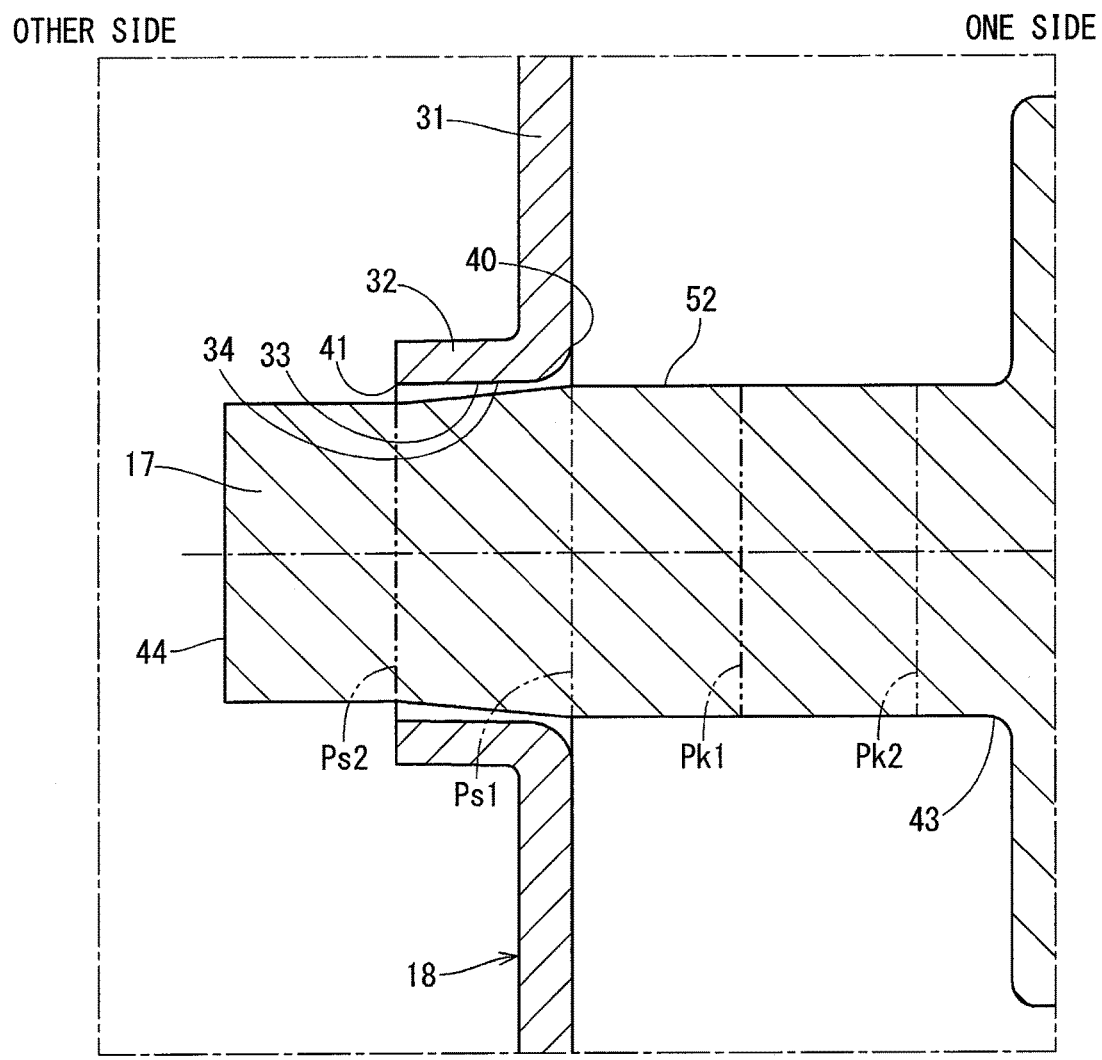
FIG. 12 is a schematic diagram showing a rod and a cover of an electromagnetic actuator of another embodiment of the present disclosure.

Alternatively, as shown in FIG. 12, the outer wall surface 52 of the rod 17 may be tapered such that the diameter of the outer wall surface 52 is progressively reduced from the proximal end 43 side toward the distal end 44 side in an axial range that is from the first distal end side specific point Ps1 to the second distal end side specific point Ps2.

Figure 13:
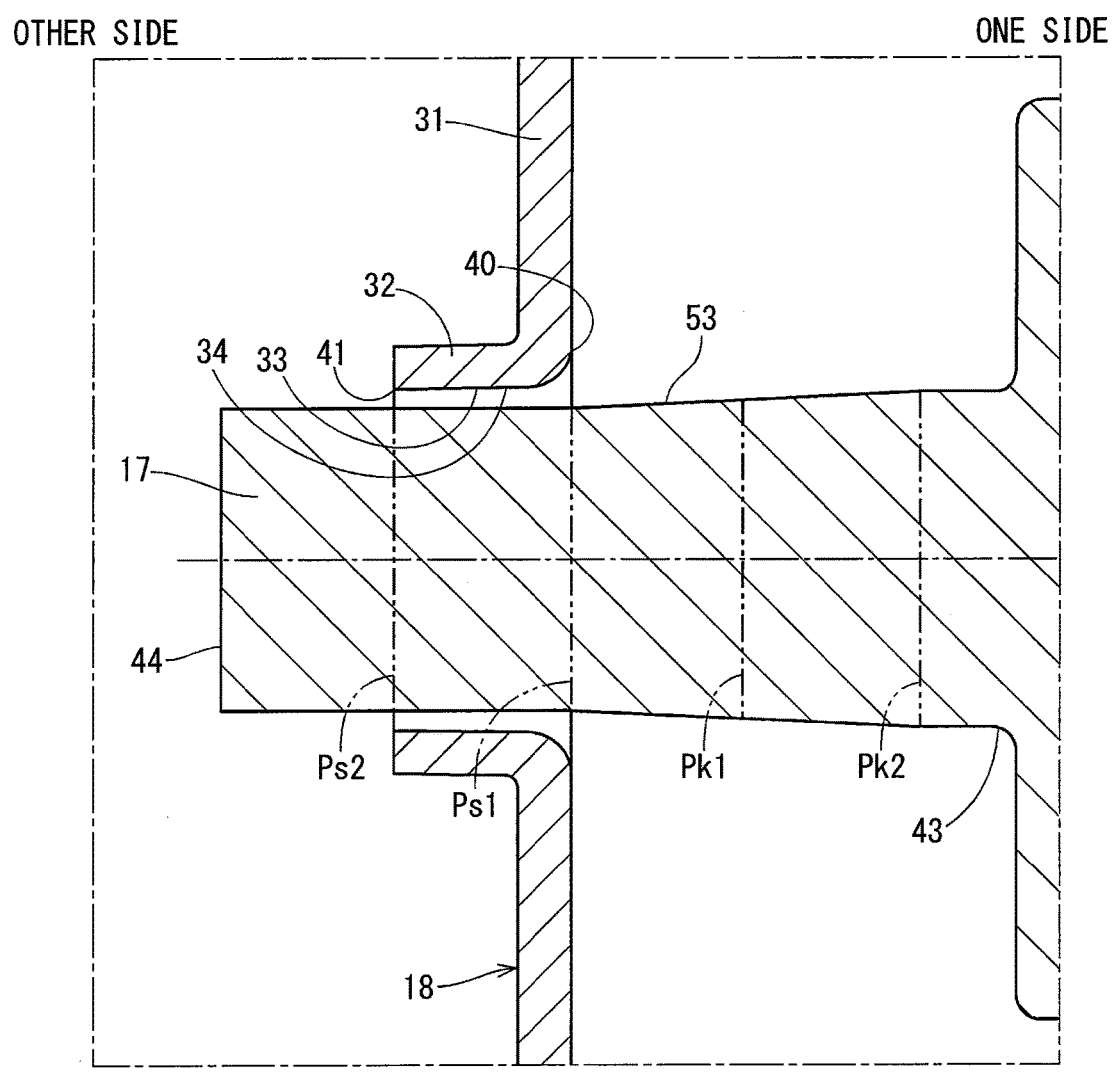
FIG. 13 is a schematic diagram showing a rod and a cover of an electromagnetic actuator of another embodiment of the present disclosure.

Further alternatively, as shown in FIG. 13, the outer wall surface 53 of the rod 17 may be tapered such that the diameter of the outer wall surface 53 is progressively reduced from the proximal end 43 side toward the distal end 44 side in an axial range that is from the second proximal end side specific point Pk2 to the first distal end side specific point Ps1.

Figure 14:
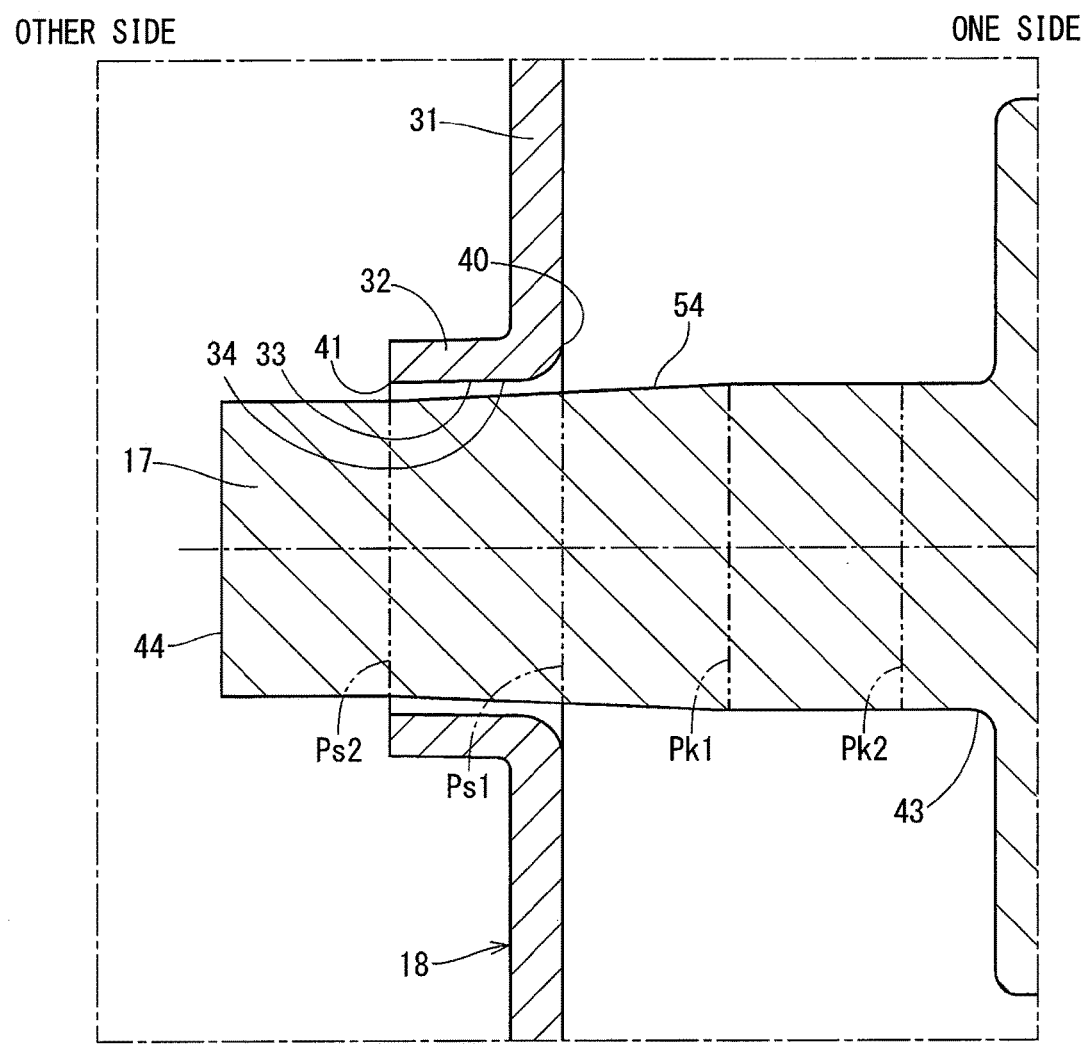
FIG. 14 is a schematic diagram showing a rod and a cover of an electromagnetic actuator of another embodiment of the present disclosure.

Further alternatively, as shown in FIG. 14, the outer wall surface 54 of the rod 17 may be tapered such that the diameter of the outer wall surface 54 is progressively reduced from the proximal end 43 side toward the distal end 44 side in an axial range that is from the first proximal end side specific point Pk1 to the second distal end side specific point Ps2.

Figure 15:
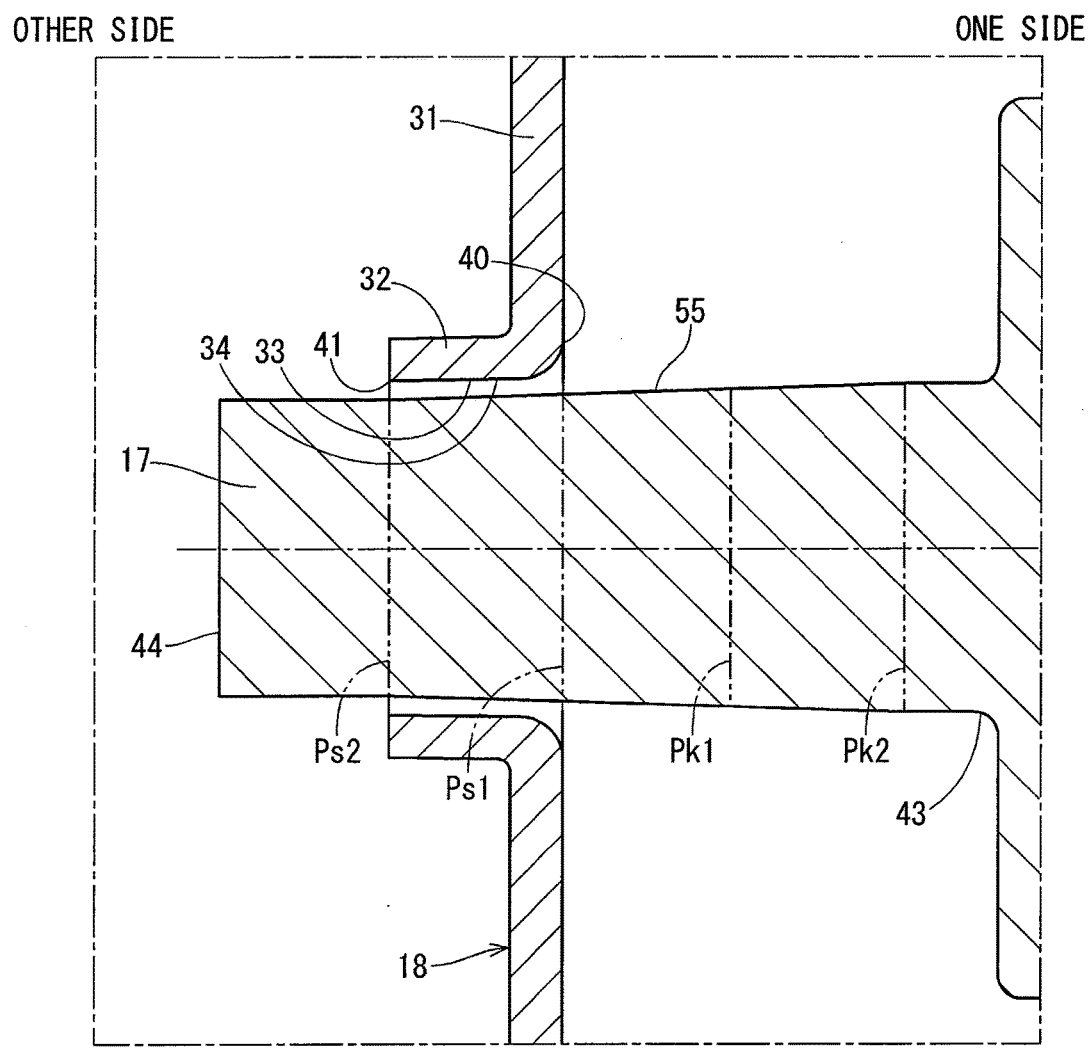
FIG. 15 is a schematic diagram showing a rod and a cover of an electromagnetic actuator of another embodiment of the present disclosure.

Further alternatively, as shown in FIG. 15, the outer wall surface 55 of the rod 17 may be tapered such that the diameter of the outer wall surface 55 is progressively reduced from the proximal end 43 side toward the distal end 44 side in an axial range that is from the second proximal end side specific point Pk2 to the second distal end side specific point Ps2.

Figure 16:
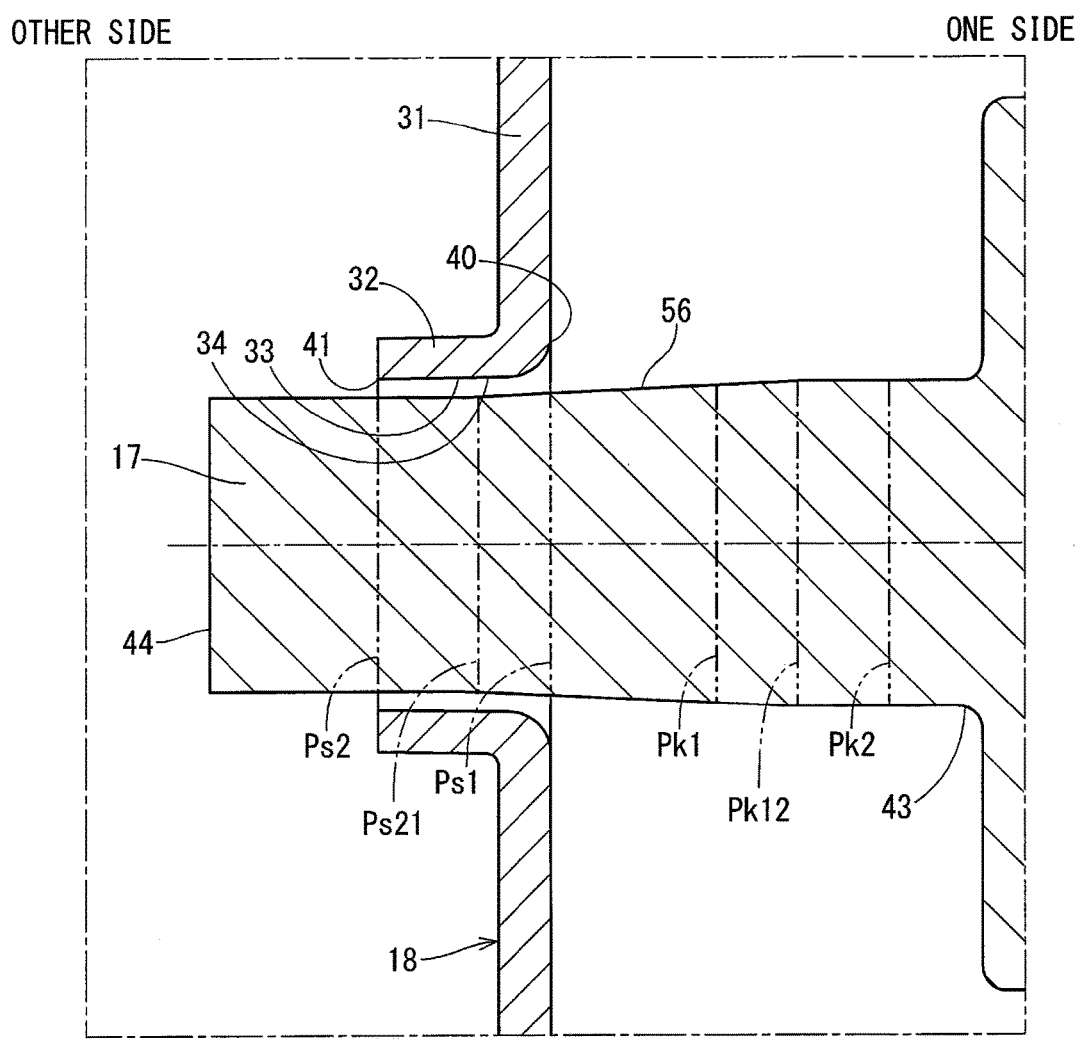
FIG. 16 is a schematic diagram showing a rod and a cover of an electromagnetic actuator of another embodiment of the present disclosure.

Further alternatively, as shown in FIG. 16, the outer wall surface 56 of the rod 17 may be tapered such that the diameter of the outer wall surface 56 is progressively reduced from the proximal end 43 side toward the distal end 44 side in an axial range that is from a point PS21, which is located between the first distal end side specific point Ps1 and the second distal end side specific point Ps2, to a point PK12, which is located between the first proximal end side specific point Pk1 and the second proximal end side specific point Pk2.

Further alternatively, the outer wall surface of the rod may be tapered such that the diameter of the outer wall surface is progressively reduced from the proximal end side toward the distal end side in an axial range that is from a point, which is located between the first distal end side specific point and the second distal end side specific point, to a point, which is located between the first proximal end side specific point and the first distal end side specific point. Further alternatively, the outer wall surface of the rod may be tapered such that the diameter of the outer wall surface is progressively reduced from the proximal end side toward the distal end side in an axial range that is from a point, which is located between the first proximal end side specific point and the first distal end side specific point, to a point, which is located between the first proximal end side specific point and the second proximal end side specific point.

Figure 17:
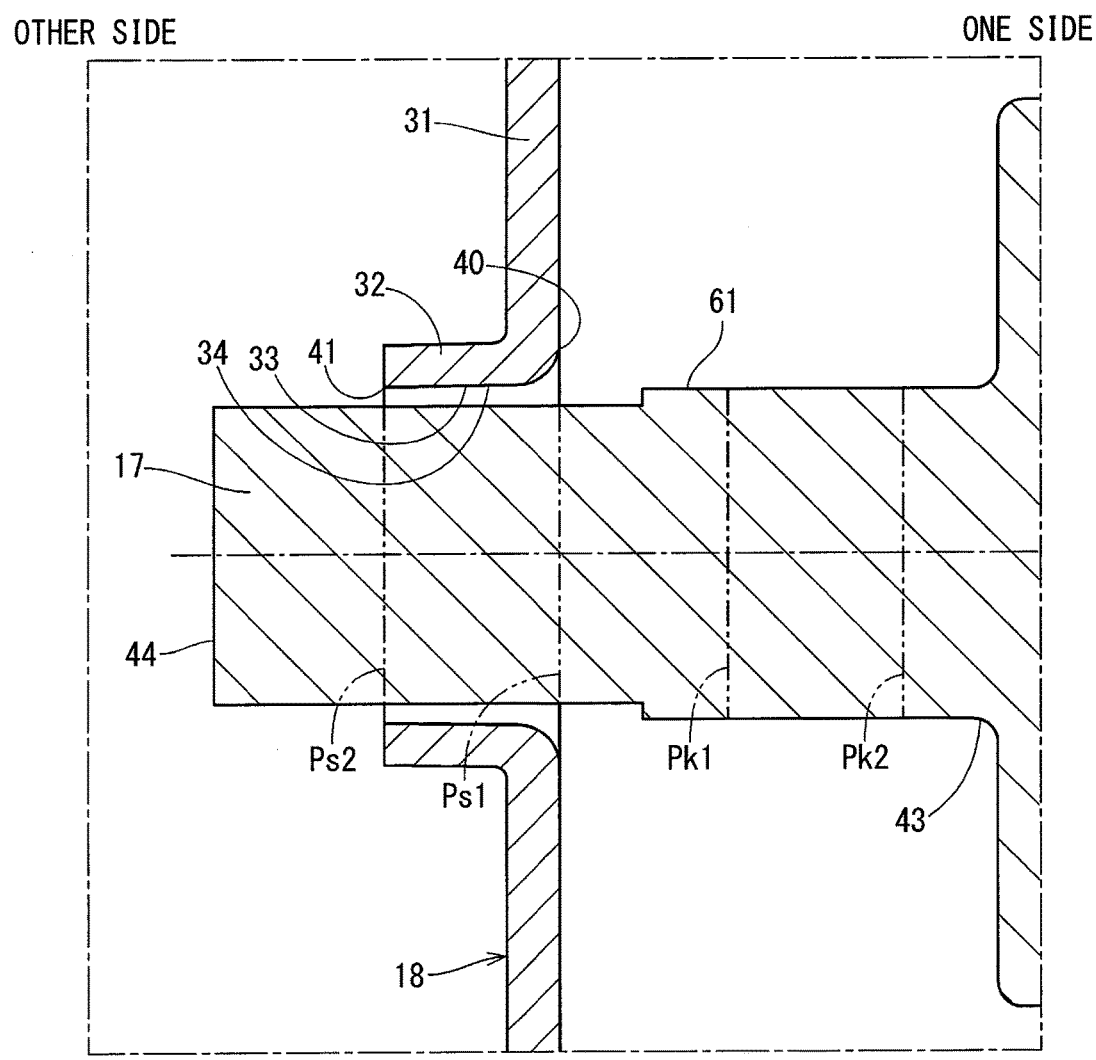
FIG. 17 is a schematic diagram showing a rod and a cover of an electromagnetic actuator of another embodiment of the present disclosure.

In another embodiment, which shares the idea of the third embodiment, as shown in FIG. 17, the outer wall surface 61 of the rod 17 may be shaped into a stepped form such that in a portion of the axial range from the first distal end side specific point Ps1 to the second proximal end side specific point Pk2, the outer wall surface 61 is stepped. Even in this way, advantages, which are similar to the advantages of the first embodiment, can be achieved.

In another embodiment, which shares the idea of the fourth embodiment, the rod may include a shaft and a ring while the ring is fitted to the shaft, and the projection is formed by the ring.

In another embodiment of the present disclosure, the cover may be divided into a plurality of cover bodies, and the cover bodies may be inwardly driven in the radial direction by a drive portion that is different from the movable portion. When the rod is driven to slide from the maximum retracted position to the maximum projected position, the cover is driven toward the rod. When the cover is moved toward the rod at the time of sliding the rod, the clearance, which is formed when the rod is placed in the maximum projected position, can be made smaller than the clearance, which is formed when the rod is placed in the maximum retracted position.

In another embodiment of the present disclosure, the rod may be formed by a common member that is common to the plunger.

In another embodiment of the present disclosure, the cover should not be limited to the pressed article that is processed through the presswork process, and the cover may be an article that is processed through, for example, a cutting process.

In another embodiment of the present disclosure, the inner wall surface of the through-hole of the cover may be a cylindrical surface that is parallel with the axial direction.

In another embodiment of the present disclosure, the cover may be formed by a common member that is common with the yoke.

Figure 18:
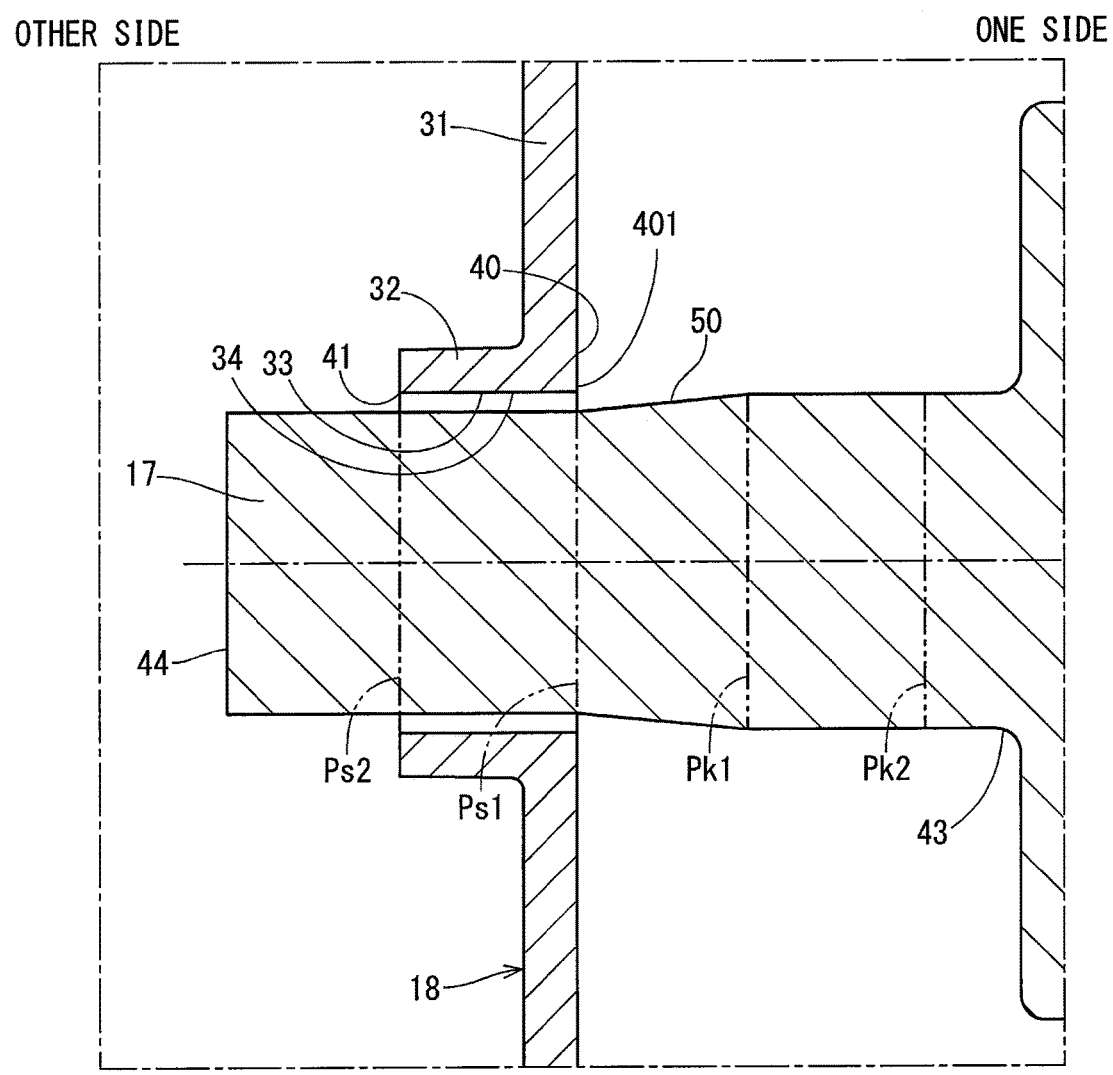
FIG. 18 is a schematic diagram showing a rod and a cover of an electromagnetic actuator of another embodiment of the present disclosure.

In another embodiment of the present disclosure, a corner 401 of the cover located at the first edge 40 side, should not be limited to a round corner and may be C-chamfered or may be acute, as shown in FIG. 18.

The present disclosure should not be limited to the embodiments discussed above and may be embodied in various other forms without departing the principle of the present disclosure.

The invention claimed is:
1. An electromagnetic actuator comprising:
a movable portion that is reciprocatable in a predetermined linear direction;
an electromagnetic drive device that includes a coil shaped into a ring form and is operable to generate a magnetic force, which drives the movable portion in the linear direction, when the coil is energized; and
a rod that projects from the movable portion in the linear direction and is movable together with the movable portion from a maximum retracted position located on one side in the linear direction to a maximum projected position located on another side in the linear direction, wherein:
the electromagnetic drive device includes a through-hole, through which the rod is received;
the rod is an output shaft that projects outward from the electromagnetic drive device to drive an external device in an axial direction;
the rod includes an outer wall surface that is slidable relative to the through-hole; and
a clearance, which is measured from the outer wall surface of the rod placed in the maximum projected position to an inner wall surface of the through-hole, is smaller than a clearance, which is measured from the outer wall surface of the rod placed in the maximum retracted position to the inner wall surface.

2. The electromagnetic actuator according to claim 1, wherein the outer wall surface is tapered such that a diameter of the outer wall surface is reduced from a proximal end toward a distal end of the rod.

3. The electromagnetic actuator according to claim 1, wherein the outer wall surface is shaped into a stepped form such that a diameter of the outer wall surface is reduced in a stepwise manner from a proximal end to a distal end of the rod.

4. The electromagnetic actuator according to claim 1, wherein:
an edge of the through-hole, which is located on the one side in the linear direction, is defined as a first edge;
an edge of the through-hole, which is located on the other side in the linear direction, is defined as a second edge;
a point of the rod, an axial location of which coincides with the second edge when the rod is placed in the maximum projected position, is defined as a first proximal end side specific point;
a point of the rod, an axial location of which coincides with the first edge when the rod is placed in the maximum projected position, is defined as a second proximal end side specific point; and
the outer wall surface includes at least one projecting surface in an axial range, which is form the second proximal end side specific point to the first proximal end side specific point.

5. The electromagnetic actuator according to claim 1, wherein:
an edge of the through-hole, which is located on the one side in the linear direction, is defined as a first edge;
an edge of the through-hole, which is located on the other side in the linear direction, is defined as a second edge;
a point of the rod, an axial location of which coincides with the first edge when the rod is placed in the maximum retracted position, is defined as a first distal end side specific point;
a point of the rod, an axial location of which coincides with the second edge when the rod is placed in the maximum retracted position, is defined as a second distal end side specific point;

a point of the rod, an axial location of which coincides with the second edge when the rod is placed in the maximum projected position, is defined as a first proximal end side specific point;

a point of the rod, an axial location of which coincides with the first edge when the rod is placed in the maximum projected position, is defined as a second proximal end side specific point; and the outer wall surface is tapered such that a diameter of the outer wall surface is reduced from a proximal end side to a distal end side of the rod at least in an axial range, which is from the first proximal end side specific point to the first distal end side specific point.

6. The electromagnetic actuator according to claim 5, wherein the outer wall surface is tapered such that the diameter of the outer wall surface is reduced from the proximal end side toward the distal end side at least in an axial range that is from the second proximal end side specific point to the first proximal end side specific point.

7. The electromagnetic actuator according to claim 5, wherein the outer wall surface is tapered such that the diameter of the outer wall surface is reduced from the proximal end side toward the distal end side at least in an axial range that is from the first distal end side specific point to the second distal end side specific point.

8. An electromagnetic actuator comprising:

a movable portion that is reciprocatable in a predetermined linear direction;

an electromagnetic drive device that includes a coil shaped into a ring form and is operable to generate a magnetic force, which drives the movable portion in the linear direction, when the coil is energized; and a rod that projects from the movable portion in the linear direction and is movable together with the movable portion from a maximum retracted position located on one side in the linear direction to a maximum projected position located on another side in the linear direction, wherein:

the electromagnetic drive device includes a through-hole, through which the rod is received;

the rod is an output shaft that projects from the through-hole to drive an external device in an axial direction;

the rod includes an outer wall surface that is slidable relative to the through-hole;

a clearance, which is measured from the outer wall surface of the rod placed in the maximum projected position to an inner wall surface of the through-hole, is smaller than a clearance, which is measured from the outer wall surface of the rod placed in the maximum retracted position to the inner wall surface;

an edge of the through-hole, which is located on the one side in the linear direction, is defined as a first edge;

an edge of the through-hole, which is located on the other side in the linear direction, is defined as a second edge;

a point of the rod, an axial location of which coincides with the first edge when the rod is placed in the maximum retracted position, is defined as a first distal end side specific point;

a point of the rod, an axial location of which coincides with the second edge when the rod is placed in the maximum retracted position, is defined as a second distal end side specific point;

a point of the rod, an axial location of which coincides with the second edge when the rod is placed in the maximum projected position, is defined as a first proximal end side specific point;

a point of the rod, an axial location of which coincides with the first edge when the rod is placed in the maximum projected position, is defined as a second proximal end side specific point; and the outer wall surface is tapered such that a diameter of the outer wall surface is reduced from a proximal end side to a distal end side of the rod at least in an axial range, which is from the first proximal end side specific point to the first distal end side specific point.

9. The electromagnetic actuator according to claim 8, wherein the outer wall surface is tapered such that the diameter of the outer wall surface is reduced from the proximal end side toward the distal end side at least in an axial range that is from the second proximal end side specific point to the first proximal end side specific point.

10. The electromagnetic actuator according to claim 8, wherein the outer wall surface is tapered such that the diameter of the outer wall surface is reduced from the proximal end side toward the distal end side at least in an axial range that is from the first distal end side specific point to the second distal end side specific point.

11. An electromagnetic actuator comprising:

a movable portion that is reciprocatable in a predetermined linear direction;

an electromagnetic drive device that includes a coil shaped into a ring form and is operable to generate a magnetic force, which drives the movable portion in the linear direction, when the coil is energized; and a rod that projects from the movable portion in the linear direction and is movable together with the movable portion from a maximum retracted position located on one side in the linear direction to a maximum projected position located on another side in the linear direction, wherein:

the electromagnetic drive device includes a through-hole, through which the rod is received;

the rod is an output shaft that projects from the through-hole to drive an external device in an axial direction;

the rod includes an outer wall surface that is slidable relative to the through-hole;

a clearance, which is measured from the outer wall surface of the rod placed in the maximum projected position to an inner wall surface of the through-hole, is smaller than a clearance, which is measured from the outer wall surface of the rod placed in the maximum retracted position to the inner wall surface;

an edge of the through-hole, which is located on the one side in the linear direction, is defined as a first edge;

an edge of the through-hole, which is located on the other side in the linear direction, is defined as a second edge;

a point of the rod, an axial location of which coincides with the second edge when the rod is placed in the maximum projected position, is defined as a first proximal end side specific point;

a point of the rod, an axial location of which coincides with the first edge when the rod is placed in the maximum projected position, is defined as a second proximal end side specific point; and the outer wall surface includes at least one projecting surface in an axial range, which is form the second proximal end side specific point to the first proximal end side specific point.

* * * * *